United States Patent [19]

Coles

[11] Patent Number: 4,750,399

[45] Date of Patent: Jun. 14, 1988

[54] ELECTRONIC MUSICAL INSTRUMENT

[76] Inventor: Donald K. Coles, 2505 Capitol Ave., Fort Wayne, Ind. 46806

[21] Appl. No.: 921,407

[22] Filed: Oct. 22, 1986

Related U.S. Application Data

[63] Continuation-in-part of Ser. No. 736,701, May 22, 1985, Pat. No. 4,640,173.

[51] Int. Cl.[4] .............................................. G09B 15/02

[52] U.S. Cl. .................................... 84/478; 84/479 A

[58] Field of Search .................... 84/1.01, 423 R, 442, 84/445, 448, 451, 478, 479 R, 479 A, 480; 340/365 VL

[56] References Cited

U.S. PATENT DOCUMENTS

| | | | |
|---|---|---|---|
| 3,141,371 | 7/1964 | Coles | 84/448 |
| 3,731,582 | 5/1973 | Gullickson | 84/479 A X |
| 3,986,442 | 10/1976 | Coles | 84/1.01 |
| 4,009,633 | 3/1977 | Coles | 84/1.01 |
| 4,048,893 | 9/1977 | Coles | 84/1.01 |
| 4,061,072 | 12/1977 | Del Costillo | 84/478 |
| 4,640,173 | 2/1987 | Coles | 84/1.01 |

OTHER PUBLICATIONS

Wicks advertisement, Piano Trade Magazine, Aug., 1961, p. 20.

*Primary Examiner*—Stanley J. Witkowski

[57] ABSTRACT

A key signature actuator for musical keyboard eases playing from music written with a difficult key signature by automatically actuating the sharps or flats in the key signature. Musical notes are associated with keyboard landmarks positioned along the keyboard rather than with fixed digitals, and the landmarks are moved bodily up or down the keyboard to identify different sequences of digitals to associate with the notes. An automated key signature actuator moves a keynote of the desired key signature to the keyboard position normally occupied by middle C, at the same time changing the overall pitch of the musical output to make the keynote sound as intended. The changeable keyboard landmarks are also used in the teaching of music and to assist the playing of music written in different notations.

17 Claims, 17 Drawing Sheets

FIG. 1
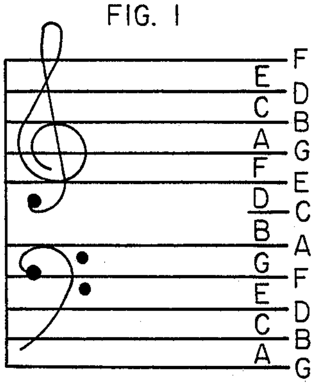
FIG. 2
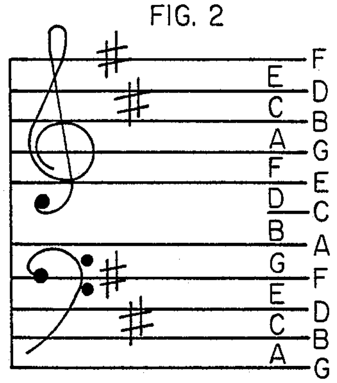
FIG. 3
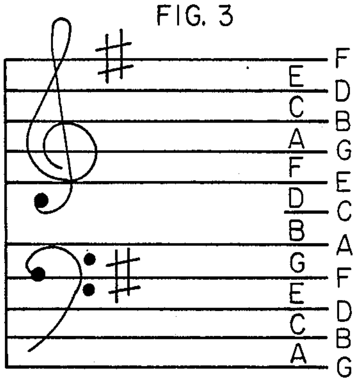
FIG. 4
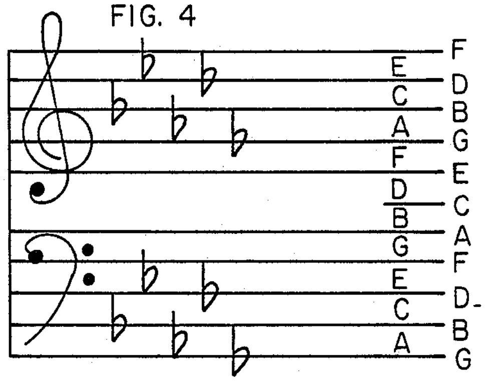
FIG. 5
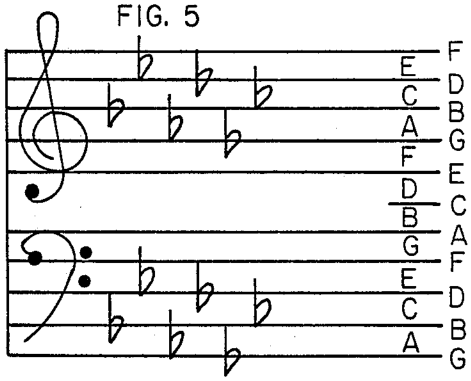
FIG. 6
| KEY NOTE | KEY SIG. CHANGES | KEY SIGNATURE SUBSTITUTIONS C | D | E | F | G | A | B |
|---|---|---|---|---|---|---|---|---|
| C♯ | 7♯ | C♯ | D♯ | E♯ | F♯ | G♯ | A♯ | B♯ |
| F♯ | 6♯ | C♯ | D♯ | E♯ | F♯ | G♯ | A♯ | |
| B | 5♯ | C♯ | D♯ | | F♯ | G♯ | A♯ | |
| E | 4♯ | C♯ | D♯ | | F♯ | G♯ | | |
| A | 3♯ | C♯ | | | F♯ | G♯ | | |
| D | 2♯ | C♯ | | | F♯ | | | |
| G | 1♯ | | | | F♯ | | | |
| C | 0 | | | | | | | |
| F | 1♭ | | | | | | | B♭ |
| B♭ | 2♭ | | | E♭ | | | | B♭ |
| E♭ | 3♭ | | | E♭ | | | A♭ | B♭ |
| A♭ | 4♭ | | D♭ | E♭ | | | A♭ | B♭ |
| D♭ | 5♭ | | D♭ | E♭ | | G♭ | A♭ | B♭ |
| G♭ | 6♭ | C♭ | D♭ | E♭ | | G♭ | A♭ | B♭ |
| C♭ | 7♭ | C♭ | D♭ | E♭ | F♭ | G♭ | A♭ | B♭ |

FIG. 14

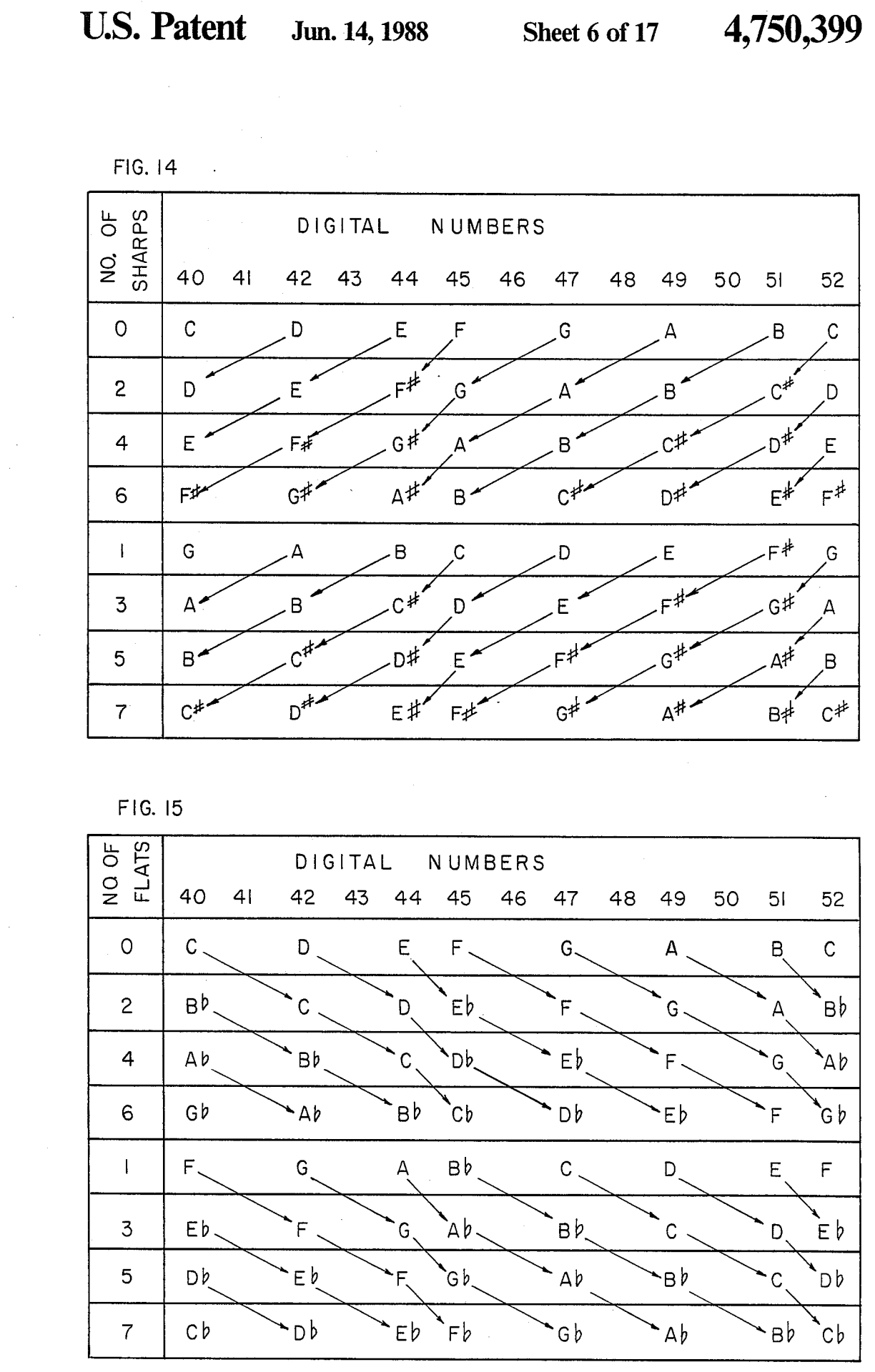

| NO. OF SHARPS | 40 | 41 | 42 | 43 | 44 | 45 | 46 | 47 | 48 | 49 | 50 | 51 | 52 |
|---|---|---|---|---|---|---|---|---|---|---|---|---|---|
| 0 | C | | D | | E | F | | G | | A | | B | C |
| 2 | D | | E | | F# | G | | A | | B | | C# | D |
| 4 | E | | F# | | G# | A | | B | | C# | | D# | E |
| 6 | F# | | G# | | A# | B | | C# | | D# | | E# | F# |
| 1 | G | | A | | B | C | | D | | E | | F# | G |
| 3 | A | | B | | C# | D | | E | | F# | | G# | A |
| 5 | B | | C# | | D# | E | | F# | | G# | | A# | B |
| 7 | C# | | D# | | E# | F# | | G# | | A# | | B# | C# |

(Column headings: DIGITAL NUMBERS)

FIG. 15

| NO OF FLATS | 40 | 41 | 42 | 43 | 44 | 45 | 46 | 47 | 48 | 49 | 50 | 51 | 52 |
|---|---|---|---|---|---|---|---|---|---|---|---|---|---|
| 0 | C | | D | | E | F | | G | | A | | B | C |
| 2 | Bb | | C | | D | Eb | | F | | G | | A | Bb |
| 4 | Ab | | Bb | | C | Db | | Eb | | F | | G | Ab |
| 6 | Gb | | Ab | | Bb | Cb | | Db | | Eb | | F | Gb |
| 1 | F | | G | | A | Bb | | C | | D | | E | F |
| 3 | Eb | | F | | G | Ab | | Bb | | C | | D | Eb |
| 5 | Db | | Eb | | F | Gb | | Ab | | Bb | | C | Db |
| 7 | Cb | | Db | | Eb | Fb | | Gb | | Ab | | Bb | Cb |

(Column headings: DIGITAL NUMBERS)

FIG. 16
| KEY SIG. CHANGES | KEY | MOVE LEFT M·d | PITCH INCREASE N = 2M ST |
|---|---|---|---|
| 2♯ | D | 1 | 2 |
| 4♯ | E | 2 | 4 |
| 6♯ | F♯ | 3 | 6 |
FIG. 17
| KEY SIG. CHANGES | KEY | MOVE LEFT M·d | PITCH INCREASE N = 2M−1 |
|---|---|---|---|
| 5♭ | D♭ | 1 | 1 |
| 3♭ | E♭ | 2 | 3 |
| 1♭ | F | 3 | 5 |
FIG. 18
| KEY SIG. CHANGES | KEY | MOVE RIGHT M·d | PITCH DECREASE N = 2M ST |
|---|---|---|---|
| 2♭ | B♭ | 1 | 2 |
| 4♭ | A♭ | 2 | 4 |
| 6♭ | G♭ | 3 | 6 |
FIG. 19
| KEY SIG. CHANGES | KEY | MOVE RIGHT M·d | PITCH DECREASE N = 2M−1 |
|---|---|---|---|
| 5♯ | B | 1 | 1 |
| 3♯ | A | 2 | 3 |
| 1♯ | G | 3 | 5 |
FIG. 20
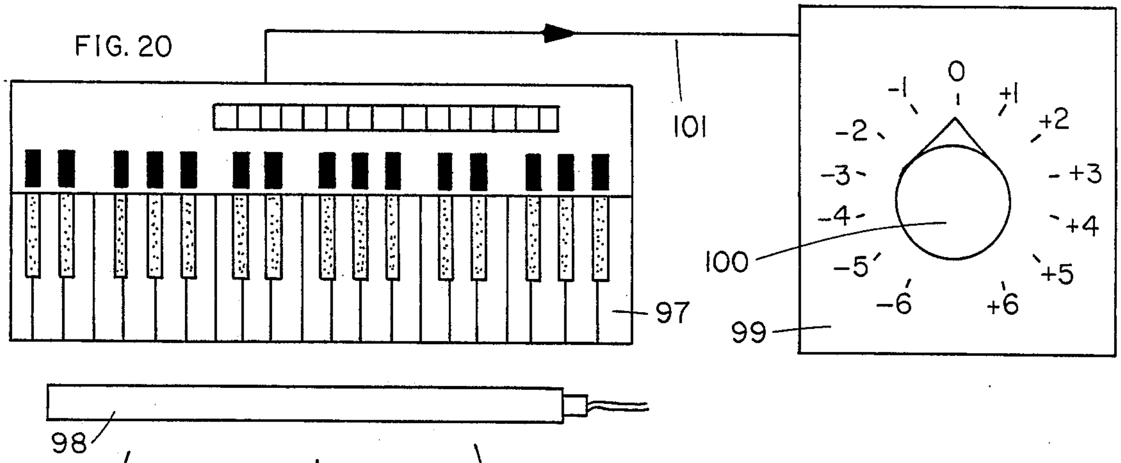
FIG. 21
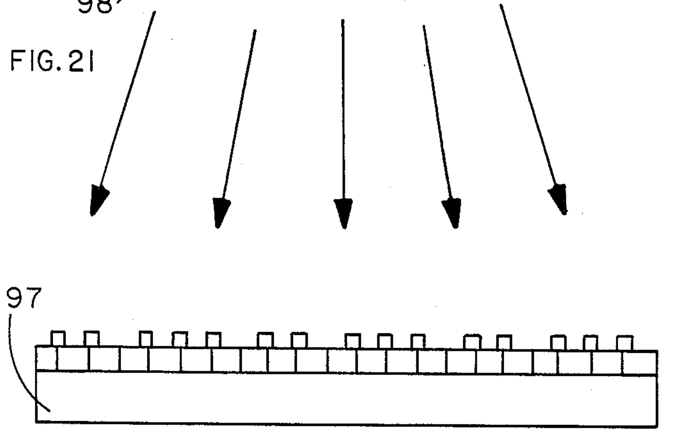

FIG. 23
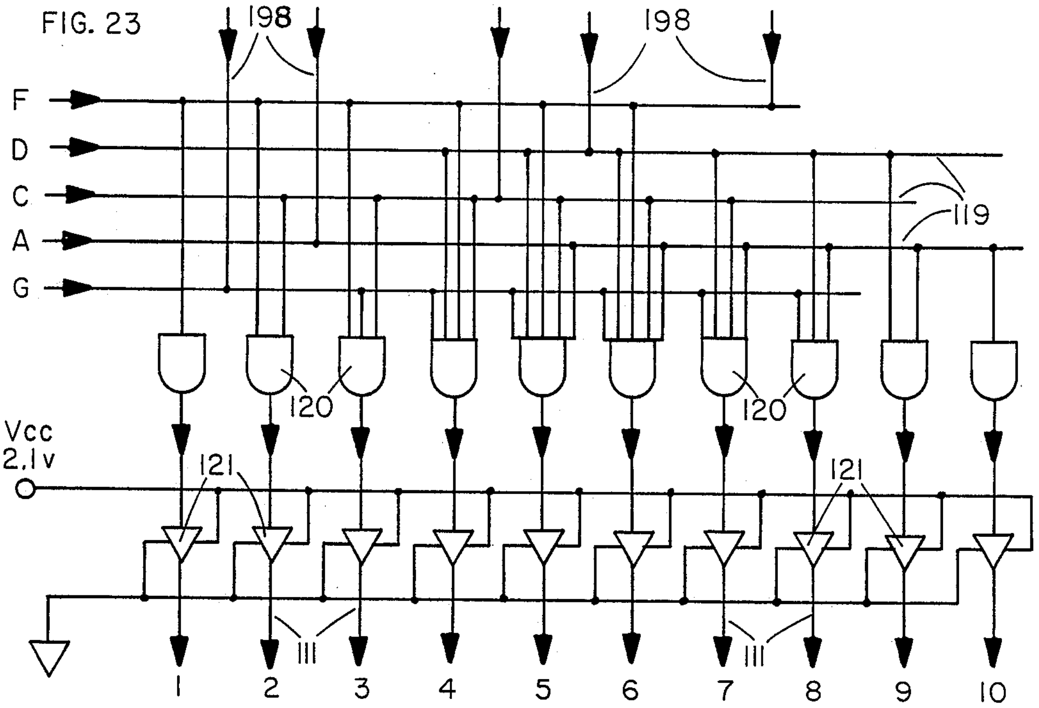
FIG. 24
| 1 | 2 | 3 | 4 | 5 | 6 | 7 | 8 | 9 | 10 |
|---|---|---|---|---|---|---|---|---|---|
| F | F | F | F | F | F | | | | |
| | C | C | C | C | C | C | | | |
| | | G | G | G | G | G | G | | |
| | | | D | D | D | D | D | D | |
| | | | | A | A | A | A | A | A |
FIG. 25
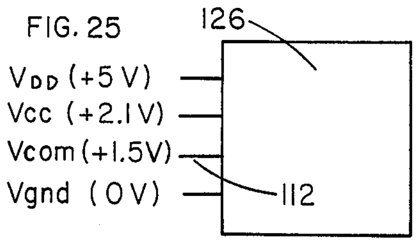
FIG. 26
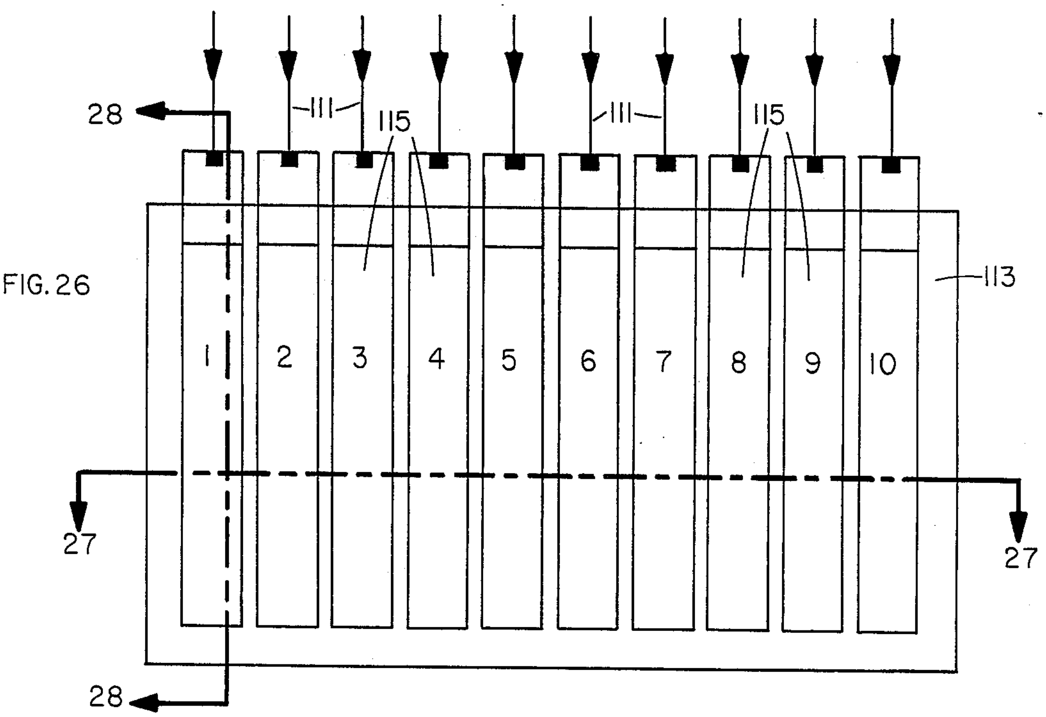

ELECTRONIC MUSICAL INSTRUMENT

CROSS REFERENCE TO RELATED APPLICATION

This application is a continuation-in-part of U.S. patent application Ser. No. 736,701, filed 5-22-85, now U.S. Pat. No. 4,640,173. The keyboard landmark disclosure there from col. 15, line 22 to col. 17, line 46, is incorporated herein by reference.

BACKGROUND OF THE INVENTION

1. Field of the Invention

A key signature actuator for a musical keyboard eases playing from music written with a difficult key signature by automatically actuating the sharps or flats in the key signature.

2. Description of the Prior Ar

The musical keyboard is structured so as to facilitate performance of music in the major diatonic key of C. As early as the fifteenth century, keyboard instruments have had a row of front digitals to play the diatonic scale and a row of back digitals to play other tones of the chromatic scale. The major mode of the diatonic scale is started with the C tone, played on a C front digital. The succeeding D, E, F, G, A, B tones are played on the succeeding D, E, F, G, A, B front digitals.

The traditional way of writing music, used as early as the eleventh century, is to position symbols on a staff consisting of horizontal lines. The seven tones of the diatonic scale are now represented by notes on the lines and in the spaces of five-line staffs. Interspersed tones of the chromatic scale are referred to the basic notes of the diatonic scale by means of sharp or flat symbols which serve as corrections to the basic diatonic notes. Thus, a chromatic tone intermediate to the C and D tone is represented by C# or D♭.

For a diatonic musical composition to be written without the use of sharp or flat symbols, it must be written in the key of C: Such a restriction would severely limit the choice of a modern composer, for he probably wants to base his composition on a tonic above or below the C tone. This would be no problem for singers or for musical instruments having uniform pitch changers; but many musical instruments do not have uniform pitch changers. So composers and their publishers resort to a rather unsatisfactory method for specifying the absolute pitch of their diatonic scale—they start the major mode of their diatonic scale on some other note than C. This method requires that one or more of the seven diatonic notes be corrected by means of a sharp or flat symbol. The composer finds it convenient to specify these diatonic note corrections by means of a key signature that is placed at the front of each line of written music. Key signatures greatly reduce the effort needed to write modern music and to understand the written music.

In the case of a keyboard player, these diatonic note corrections require playing of the back digitals. This detracts from the former virtue of the traditional keyboard, of providing wide front digitals for the most commonly used tones. And having learned to play a musical composition written in one key, a keyboard musician finds that playing the composition written in a different key requires quite different fingering. Furthermore, the ordinary keyboard player has difficulty remembering and playing all the sharps or flats called for in the fourteen key signatures of the written music.

To alleviate these difficulties, a keyboard instrument can be provided with a device to physically actuate the tone corrections specified in the key signature. Such a device, which I call a key signature actuator, was disclosed by Martin Philipps in 1886 (U.S. Pat. Nos. 354,733 and 519,071). If, for example, the device was set for a key signature with one sharp, then the F front digital would play *not* the F tone but the F# tone instead, as called out in the key signature. This century-old key signature actuator has not been widely used because of its mechanical complexity and expense. Indeed no key signature actuators appear to be commercially available.

Uniform pitch changers, which are widely available commercially, are generally used to change the pitch of the keyboard output *away from* the pitch of written music, perhaps to accommodate a particular singer or group of singers. However, for two seldom-used key signatures calling for seven sharps and seven flats (keys of C-sharp and C-flat) the musical composition can be played in the key of C and a uniform pitch changer can be used to change the pitch of the keyboard output *to* the pitch of the written music. This simple device does not work for the other twelve key signatures of written music, however, because in order to play a diatonic scale on the front digitals it would be necessary to associate a sequence of seven notes in written music with a sequence of seven digitals of the keyboard which is shifted from the sequence of seven digitals normally associated with the seven notes.

It would of course be possible rewrite all music in the key of C for the benefit of keyboard players possessing uniform pitch changes, but such rewritten music would not be satisfactory for playing on other instruments or on other keyboards not having uniform pitch changers. Thus a device to ease playing from music written with difficult key signatures (without rewriting the music) is badly needed.

Electrical versions of a key signature actuator are described in my U.S. Pat. Nos. 3,986,422 and 4,048,893. The second of these inventions is unable to actuate key signatures having six or seven flats or sharps, and the keyboard fingering of accidentals is quite different for different key signatures.

U.S. Pat. No. 3,986,422 and my co-pending U.S. patent application Ser. No. 736,701 describe key signature actuators that do not have these disadvantages, but they require two extra back digitals per octave span. All of these key signature actuators operate by altering the interdigital musical intervals of the tones played by a fixed set of front digitals.

A key signature actuator greatly reduces the mechanical difficulty of playing from music written in other keys than C, because the most frequently used tones are again played on the wide front digitals of the keyboard. The mental difficulty of reading from written music is also reduced, because the musician need not constantly remember the sharps or flats called out in its key signature. Unfortunately, key signature actuators are not generally available to the suffering inexpert keyboard player.

Traditionally, the front digitals are identified by their position with respect to the groups of two or three back digitals, which serve as landmarks. Beginning keyboard students are taught to recognize the letter label for each note of written music, and to find its corresponding front digital on the keyboard using the grouping of the back digitals as landmarks.

A more direct association between the written notes and the digitals of the keyboard would be achieved by a marking on the front digitals which corresponds to the staff lines of the written music. Unfortunately, keyboards with such marking are not generally available to potential keyboard musicians.

A uniform musical keyboard having alternating front and back digitals was described in 1708 by Conrad Hanfling in Germany. Such a keyboard needs a different set of landmarks to guide the player, since the traditional grouping of two and three back digitals is absent. My U.S. Pat. Nos. 3,141,371 and 3,986,422 described landmarks which map lines of the treble and bass staffs onto this uniform keyboard. Music teachers have been reluctant to teach music on the uniform keyboard, partly because they themselves have become so dependent on the landmarks formed by the irregular grouping of the back digitals.

Many musicians and inventors have proposed other keyboard structures and music notations. In spite of their considerable benefits, the difficulties of changing over to a new system have prevented most improvements from being generally adopted.

SUMMARY OF THE INVENTION

A key signature actuator for a musical keyboard eases playing from music written with a difficult key signature by automatically actuating the sharps or flats in the key signature.

In the preferred embodiment, the keyboard has five back digitals per octave span, like the traditional keyboard, except that the back digitals are de-emphasized as landmarks by making them light gray. An array of dark movable landmarks along the back of the keyboard simulates the traditional groupings of two and three back digitals, and musical notes are associated with these movable landmarks, rather than with fixed digitals. When in reading from written music a key signature is indicated, the dark landmarks are shifted so that the keynote of that key signature is placed by a tonic digital (a fixed front digital to the immediate left of a group of two back digitals). In one embodiment the tonic digital is made to sound the key tone corresponding to that key signature by means of an automated uniform pitch changer which uniformly changes the pitch of the musical output. Thus all the diatonic tones in the indicated key will be automatically sounded by the front digitals of the keyboard.

In other embodiments, electrically changeable keyboard landmark elements representing musical staffs and/or electrically changeable alpha-numeric characters are positioned in front of the keyboard, aligned with the front digitals, or mounted on the front digitals themselves.

The landmark elements may be electrochromic, ferroelectric, or a more common liquid crystal design, the light absorption and reflectivity of each landmark element being electrically changeable.

One object of my invention is to ease playing from music written with difficult key signatures by automatic actuation of the sharps or flats in the key signatures on a keyboard having the traditional seven front digitals and five back digitals per octave span.

A second object of my invention is to aid in the teaching of music on a musical keyboard.

A third object of my invention is to assist trained keyboard musicians to play from music written in different notations.

BRIEF DESCRIPTION OF THE DRAWINGS

FIGS. 1–5 show representative key signatures.

FIG. 6 is a table of diatonic key signatures.

FIGS. 14, 15 are tables of diatonic notes played by front digitals of the keyboard using key signature actuation.

FIGS. 16–19 are tables of uniform pitch changes for different positions of the keyboard landmark pattern.

FIGS. 20, 21 show the musical keyboard, a pitch changer, and sound module.

FIGS. 22–25 show key signature selection and landmark control circuitry.

FIGS. 26–29 show details of an electrically changeable landmark module.

DESCRIPTION OF THE PREFERRED EMBODIMENT

Traditional music notation is based on the major diatonic scale, which has intertonal musical intervals of 2-2-1-2-2-2-1 semitones. Notation for keyboard music is shown in FIGS. 1 to 5. Referring to these figures, lines of the treble staff are labeled, E, G, B, D, F. Lines of the bass staff are labeled G, B, D, F, A. The musical staffs shown in FIG. 1 are used to play music in the key of C. Music to be played in one of the other fourteen keys uses a key signature as shown in FIGS. 2–6.

FIG. 2 shows a key signature indicating that the notes F♯ and C♯ are to be substituted where the F and C notes are indicated in the score. This substitution makes the diatonic scale start on the D note instead of the C note. The note substitutions for all fourteen traditional key signatures are listed in FIG. 6.

Referring to FIG. 6, the first column shows the key note (tonic note) on which the major diatonic scale is based. The notes written on the musical staffs are shown at the top of the table; their substituted notes, as specified by the key signatures, are shown in the body of the table.

The traditional musical keyboard is structured so that its front digitals play the major diatonic scale in the key of C, where the C note is associated with a front digital to the immediate left of a group of two back digitals. The front digitals can play the major diatonic scale in other keys, however, if its keynote is located at the right place on the keyboard. For purposes of discussion, let us define a tonic digital as a front digital to the immediate left of a group of two back digitals. Then we make a more general statement—the traditional keyboard is structured so that its front digitals play the major diatonic scale starting with its keynote on a tonic digital. My invention provides assistance to the musician in positioning other keynotes than C on a tonic digital.

Trained musicians are accustomed to locating the different musical notes on the keyboard by using the irregular grouping of the back digitals as landmarks. I therefore use a movable landmark pattern that simulates the irregular spacing of the back digitals, and associated musical notes with particular places in the movable landmark pattern, rather than with fixed digitals. In order to overcome the traditional influence of the back digitals as keyboard landmarks, the movable keyboard landmarks simulate as realistically as possible the traditional back digitals. The musician normally views the back digitals by their reflection of light from the room as black objects among the white extensions of the front digitals. The movable landmarks therefore simulate the black digitals as closely as possible by means of electrically changeable landmark elements that can absorb incident light either strongly or weakly, thus appearing either dark or light by reflection of light from the room. Part of the landmark display is shown in FIG. 7.

Figure 7:
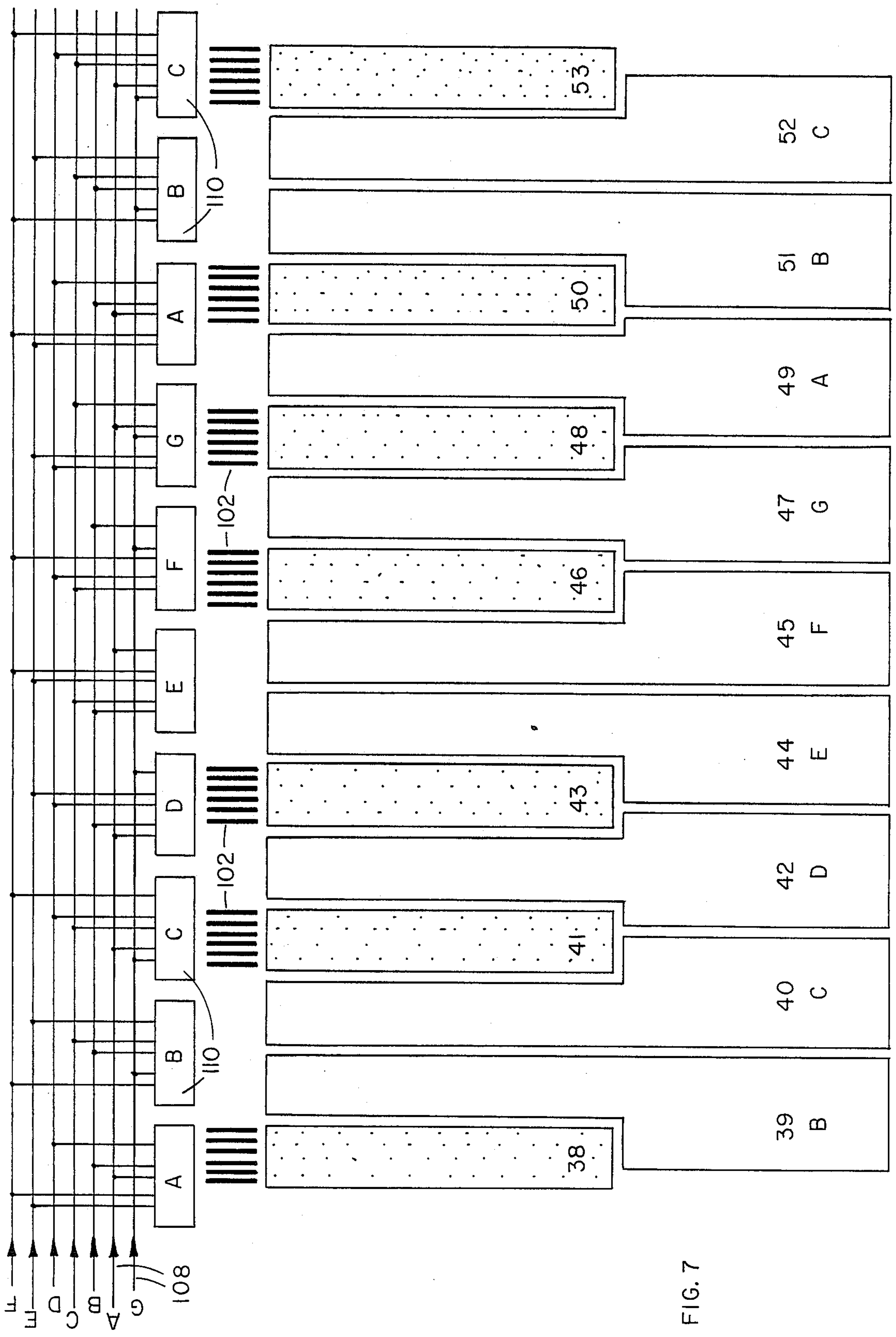
FIGS. 7–13 show a keyboard landmark pattern in different positions along the keyboard.

Referring to FIG. 7, the keyboard has the traditional configuration with seven front digitals and five back digitals per octave span. Starting with front digital no. 40, the first, third, fifth, sixth, eighth, tenth and twelfth digitals are front digitals; the second fourth, seventh, ninth and eleventh digitals are back digitals. Since the pattern of front and back digitals is periodic with a period of twelve digitals, a single octave span suffices to describe the whole keyboard.

Dark landmarks 102 can be moved along the keyboard using control modules 110, which are described later. In FIG. 7, the landmarks are in standard position for playing in the key of C, in which case they are aligned with the back digitals. The back digitals themselves are de-emphasized as landmarks by making them a light gray.

The digitals are numbered in order from left to right; the notes they play increasing in pitch in the same order. When playing in the key of C, digital no. 40 plays the note middle C and digital no. 42 plays the note middle D. This D note is two semitones above middle C. The back digital positions accord with the front digitals playing the major diatonic scale, which has interdigital musical intervals of 2-2-1-2-2-2-1 semitones. In FIG. 7, this diatonic scale starts on the keynote middle C as played by standard tonic digital no. 40.

Suppose that a composer writes music based on the diatonic scale, but with its tonic note two semitones higher than C. Because many musical instruments don't have pitch changes, he starts his diatonic scale on the D note. If one starts on the D note and proceeds up the diatonic scale, one finds that he must substitute the note F♯ for F and the note C♯ for C. In keyboard music, such substituted notes are usually played on the back digitals, with the difficulty for the player described earlier.

Figure 8:
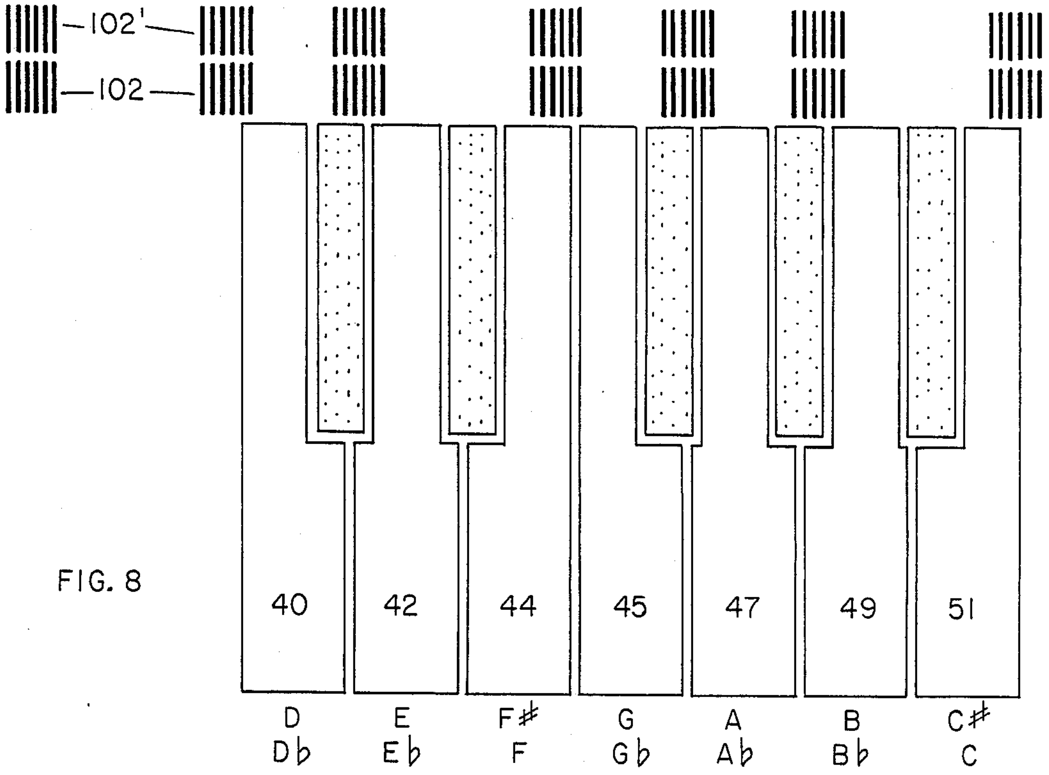

My solution to the keyboard difficulty is to make use of the movable landmarks on the keyboard to move the keynote D to a tonic digital and to uniformly raise the musical output pitch by two semitones, so that the front digitals will naturally sound the diatonic scale in the key of D. To actuate the key signature for the key of D, a player on my keyboard uses a key signature selector switch (shown in FIG. 22) to move the keyboard landmark pattern one seventh of an octave span to the left of its standard position, as shown in FIG. 8. At the same time, the player uses a pitch changer (shown in FIG. 20) to raise the musical output pitch uniformly by two semitones above standard pitch, so that standard tonic digital no. 40 sounds the D tone.

Referring to FIG. 8, numbering of the digitals has not been changed, but the landmark pattern has moved one step to the left of its standard position. The grouping of two landmarks 102 above digital no. 40 suggests that this tonic digital now plays the D note. The other notes of the diatonic scale in the key of D will be played by the succeeding front digitals, as indicated by their letter labels. The notes F♯ and C♯ are played by front digitals 44 and 51 respectively.

Reflection of landmarks 102 in a mirror produces images 102' behind the landmarks 102, which have the effect of making the landmarks appear twice as large as they really are, thus effecting a closer simulation of the back digitals. The thin back surface mirror is shown as 167 in FIG. 29.

In reading and playing music, notes written on the musical staffs should be located on the keyboard by means of the movable landmarks, rather than by the back digitals. If one selects the key of E by means of the appropriate pushbutton, the movable landmarks will be moved two steps to the left of their standard position, as shown in FIG. 9.

Figure 9:
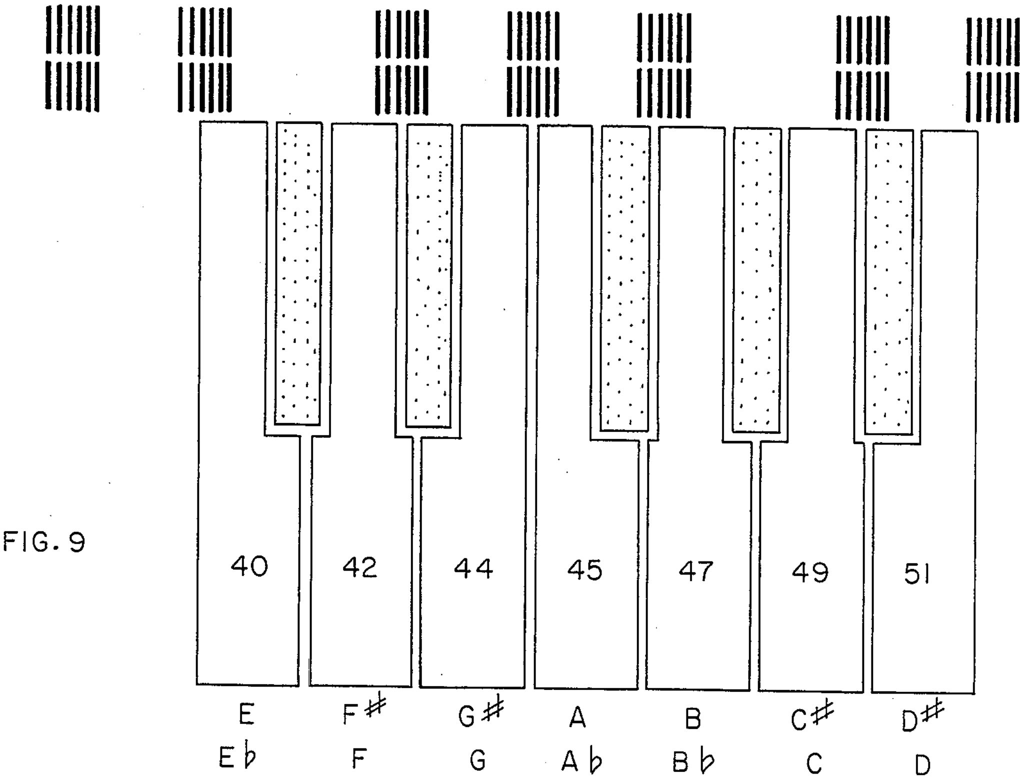

Referring to FIG. 9, the group of two landmarks has moved leftward from their standard position to the immediate left of digital no. 40. This suggests that digital no. 40 should play the E note. Now the pitch changer is set four semitones above standard pitch so that digital no. 40 sounds the E tone, and the succeeding front digitals sound the diatonic scale in the key of E. The notes F♯, G♯, C♯, D♯ are then placed by front digitals 42, 44, 49, 51 respectively. Moving the landmarks one more step to the left activates the key signature for the key of F, as shown in FIG. 10.

Figure 10:
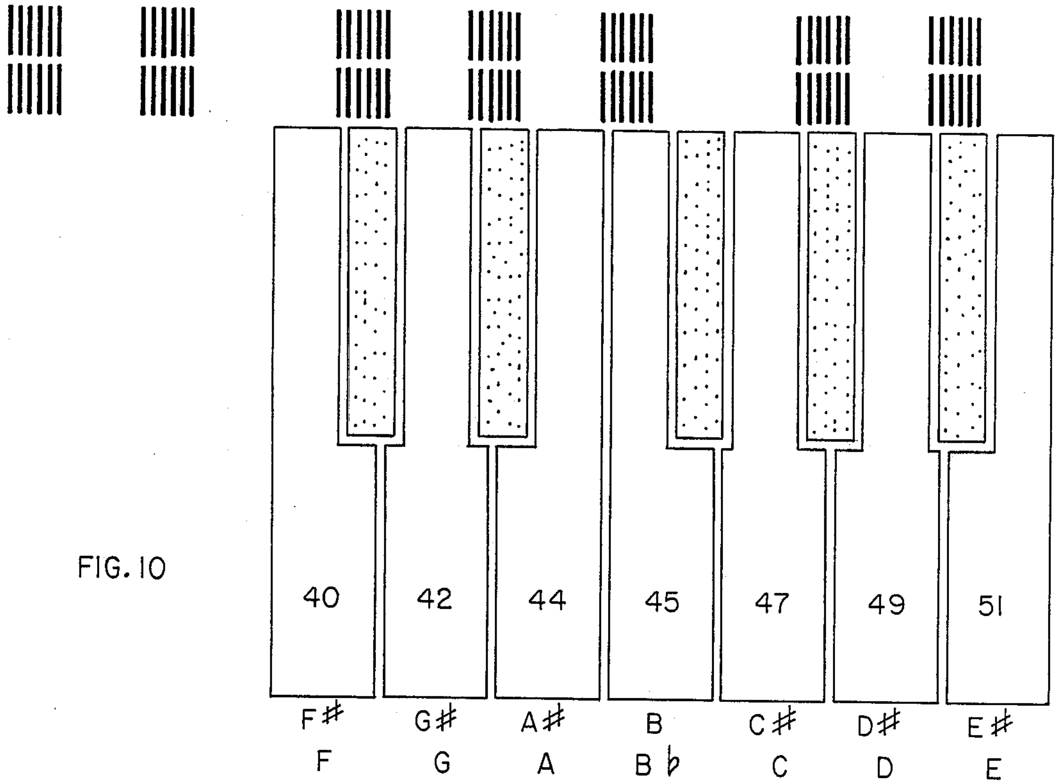

Referring to FIG. 10, the group of three landmarks, having moved three steps leftward to the immediate right of digital no. 40, suggest that this tonic digital now plays the F note and the succeeding front digitals play in the key of F (assuming that the pitch changer has been set to five semitones above standard pitch). In this key the note B♭ is played by front digital no. 45. Since the landmark pattern repeats itself every seven steps, instead of saying that the landmark pattern has moved three steps to the left of its standard position, we could equally well say that it has moved *ten* steps to the left of its standard position. (In number theory, the number ten is congruent to the number three modulo seven.) In the same way, a landmark pattern position which is four, five, or six steps to the left of its standard position can equally well be described as three, two, or one step respectively to the *right* of the standard landmark position. This second description enables a more definite specification for the proper setting of the pitch changer. The landmark pattern position three steps to the right of its standard position is shown in FIG. 11.

Figure 11:
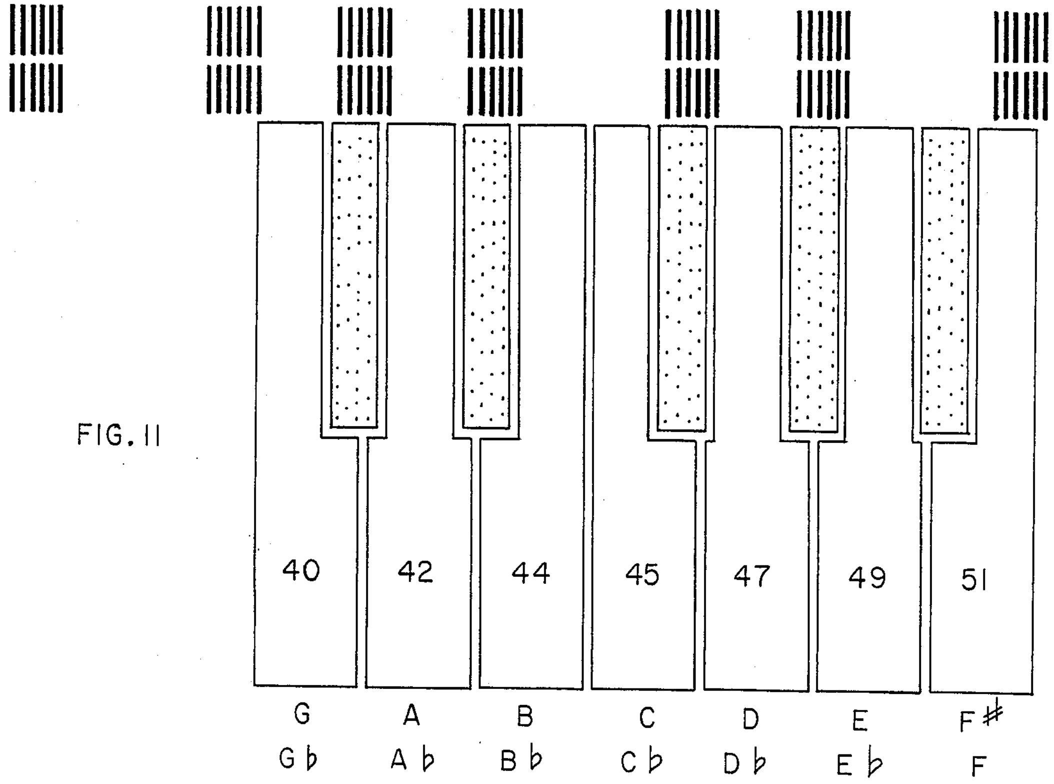

Referring to FIG. 11, from the position of tonic digital 40 relative to the group of three landmarks, this digital should play the G note and the succeeding front digitals play in the key of G. Front digital no. 51 then plays the note F♯. For the key of A (FIG. 12), the landmark pattern is two steps to the right of its standard position; and for the key of B (FIG. 13), the landmark pattern is one step to the right of its standard position.

Figure 12:
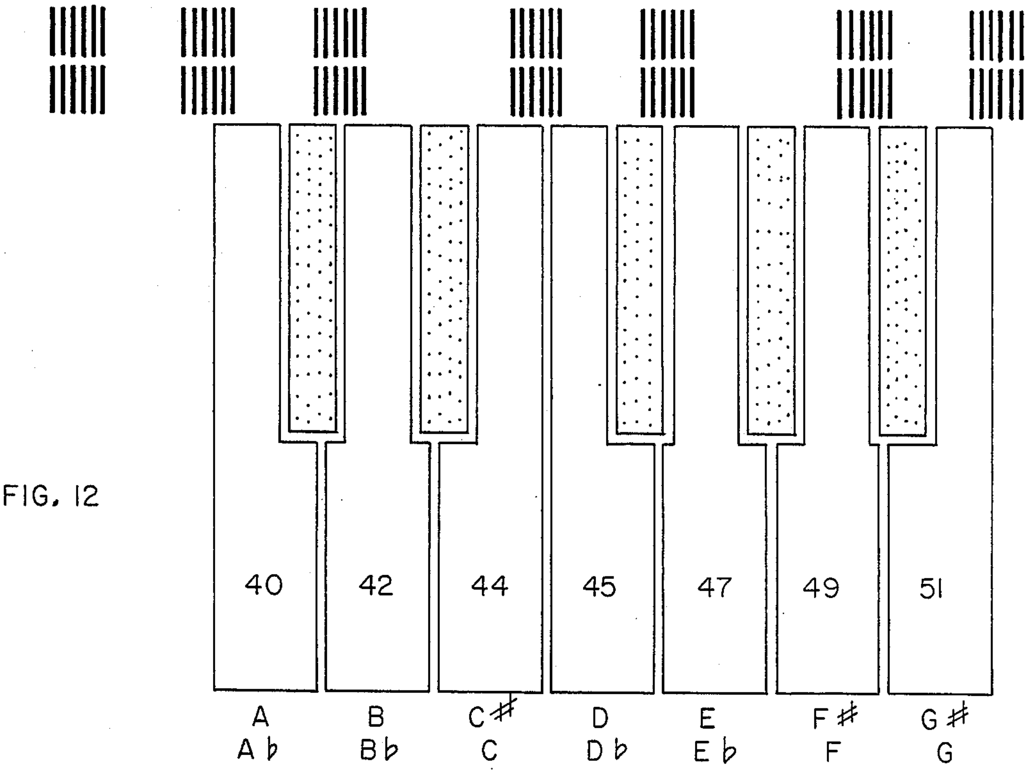
Figure 13:
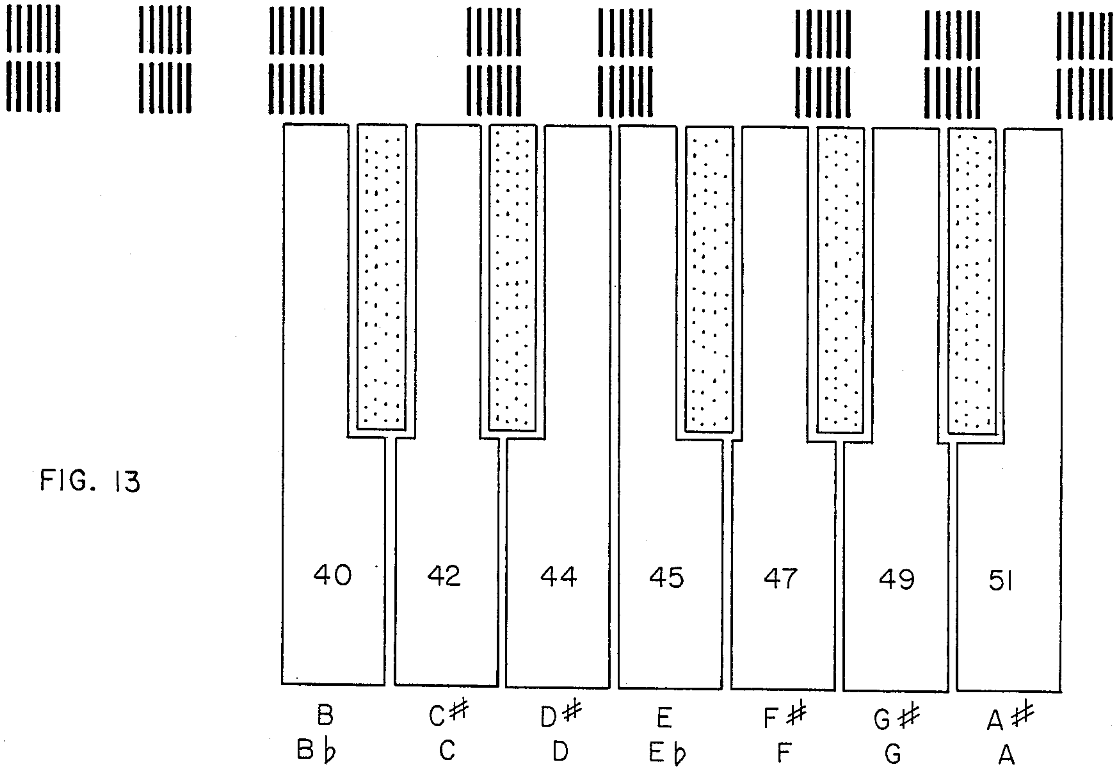

Referring to FIG. 12, the position of front digital no. 40, to the immediate right of the central landmark of the group of three, identifies it as a tonic digital for the key of A or A♭. Referring to FIG. 13, the position of digital no. 40, to the immediate right of the group of three landmarks, identifies it as a tonic digital for the key of B or B♭.

Actuations of the seven key signatures with sharps using my apparatus produce the results shown in FIG. 14. Referring to FIG. 14 the top row of numbers identify thirteen consecutive digitals starting with digital no. 40. The first column gives the number of sharps in the key signature. The body of the table gives the diatonic notes played by the front digitals. For example, the keynotes are played by tonic digitals nos. 40 and 52. As another example, for the key signature with two sharps, the front digitals play the same notes that they play in the key of C, except that front digital no. 51 plays a note that is only one semitone below the D note; namely C♯, and front digital no. 44 plays a note that is only one semitone below the G note; namely F♯.

Similarly for one sharp, front digital no. 51 plays a note that is one semitone below the keynote, namely F♯. When the F natural note occurs, it is played by the back digital to the immediate left of F♯; namely back digital no. 50. FIG. 14 shows that there is always a back digital to the immediate left of a sharped note to play the naturalized note. It might appear that such a digital is unavailable to play F natural in the key signature with six sharps (key of F♯), but F natural is not an accidental note here; this note, included as E♯ in the key signature, is one of the seven diatonic notes in the key of F♯. On the keyboard it is, therefore, played on a front digital, just like the E note in the key of F. With my key signature actuator, the keyboard fingering of a musical composition should be exactly the same in all fifteen keys.

Key signatures containing flats are shown in FIGS. 4 and 5. The key signature shown in FIG. 4 produces a diatonic scale in the key of D♭. This key signature is actuated by positioning the pattern of landmarks as shown in FIG. 8; but in this case the overall pitch is raised by only one semitone above standard pitch, so that standard tonic digital no. 40 sounds the D♭ tone. For the other key signatures containing flats, the diatonic notes played by the front digitals are as shown in FIG. 15.

FIG. 15 is like FIG. 14 except that the first column gives the number of flats in the key signature. For a key signature having six flats, for example, (shown in FIG. 5) the keynote played by tonic digital no. 40 is G♭. Whenever the naturalized note occurs, it is played by the back digital to the immediate right of the notated front digital. For the key signature with six flats, for example, the A natural note is played by back digital no. 43. It appears that there is no back digital to play the B natural note; but this note is included as C♭ in the key signature, since it is one of the seven diatonic notes in the key of G♭. As such, it is properly played on a front digital.

The digitals of my keyboard send pitch signals to a separate sound module as shown in FIG. 20. Referring to FIG. 20, keyboard 97 sends electrical signals through a set of wires 101 to sound module 99 which contains a uniform pitch changer 100. The technology of tone generation of electrical means and of uniform musical pitch changing are well known.

The proper settings of the pitch changer for each movement of the display landmarks are shown in FIGS. 16–19. In these figures the landmark pattern moves from its standard position a distance of Md, where M is a number in the range 1 to 3 inclusive, and the length of a step "d" is equal to one seventh of an octave span. The uniform change of musical output pitch required to play a musical composition at the pitch specified by its key signature is given in the last column of each figure. The landmark pattern movement is to the left in FIGS. 16, 17 and to the right in FIGS. 18, 19.

In FIGS. 16, 17 the uniform increase of musical output pitch over standard pitch is either 2M or 2M−1 semitones, depending on whether the key signature contains sharps or flats.

In FIGS. 18, 19 the uniform *decrease* of musical output pitch from standard pitch is either 2M or 2M−1 semitones, depending on whether the key signature contains flats or sharps.

A front view of my keyboard is shown in FIG. 21. Referring to FIG. 21, keyboard 97 including digitals and display landmarks may be illuminated by daylight or by artificial lighting such as lamp 98.

In the traditional keyboard, the front digitals in a single octave span all have different shapes; the backward extensions of the front digitals being designed to make as much room as possible for the players's fingers at the back of the keyboard. Four front digitals in each octave span have a straight side—a convention which has the effect of dividing the octave span into two sections: the first section containing three front digitals and two back digitals; the second section containing four front digitals and three back digitals. Since two-thirds is smaller than three-fourths, the back part of the front digitals in the first section will be slightly wider than the back part of the front digitals in the second section, assuming that the back digitals all have the same width and that the front digitals all have the same width at the front of the keyboard.

My landmarks move in equal steps, the length of a landmark step being "d", the width of a front digital at the front of the keyboard, or one seventh of an octave span. The landmarks are made up of small electrically changeable landmark elements, equal in size, the center-to-center spacing of the elements being one twelfth of a landmark step. Each element exists in two visual states—in one state the element absorbs incident light strongly so that it appears dark; in the other state the element absorbs incident light weakly so that it appears to have a light shade. Each dark landmark contains six elements. The white spaces between the dark landmarks have an average width of eight elements in the first section of the octave span, and of 7.5 elements in the second section. This adds to a possible thirty-six elements in the first section and forty-eight elements in the second section. The pattern of dark and light landmark elements is moved bodily along the keyboard in steps of twelve elements.

Figure 22:
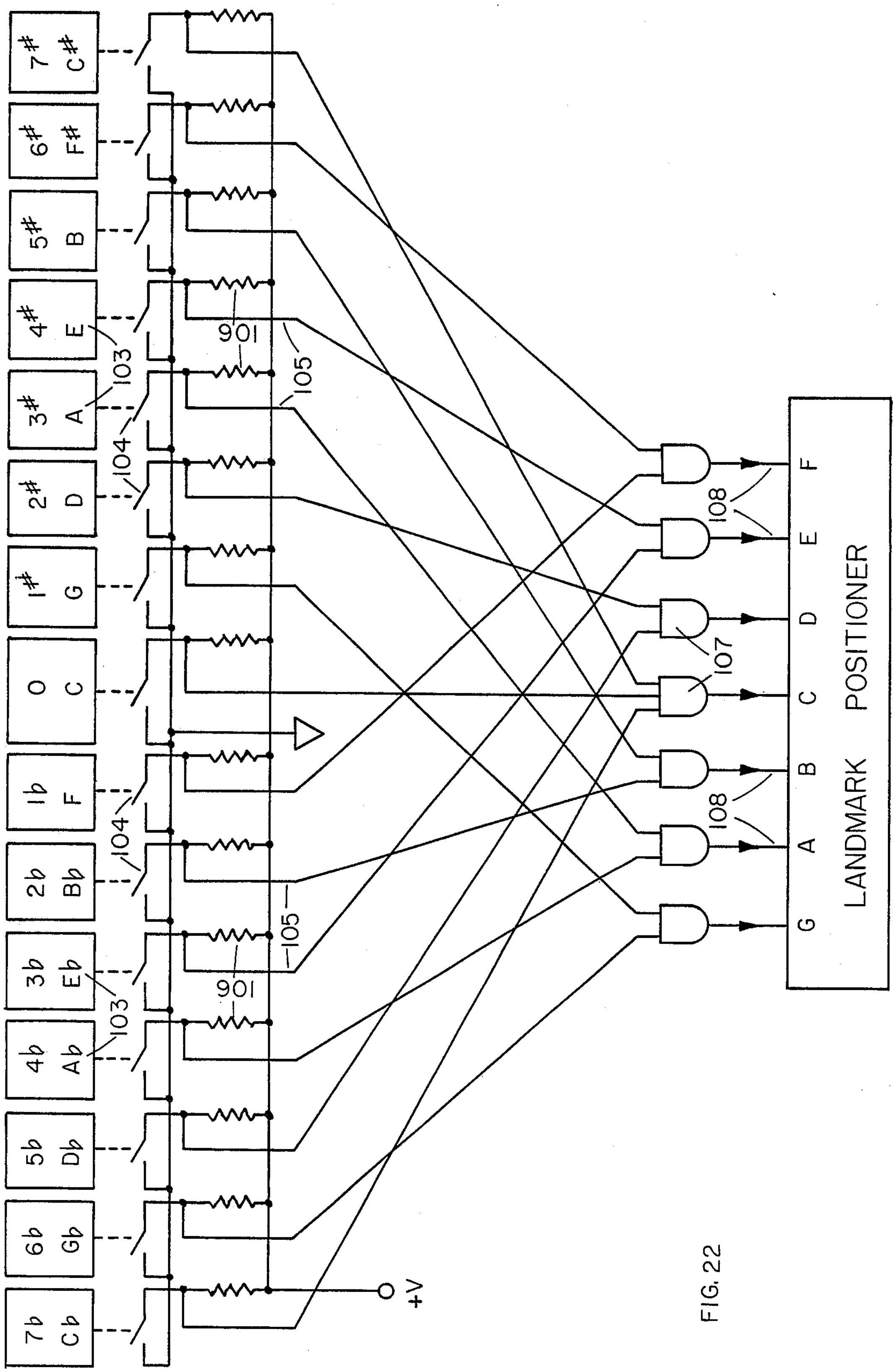

The key signature selection circuits are shown in FIG. 22. Referring to FIG. 22, selection of a key signature is made on the array of pushbuttons 103, together with their normally-open switches 104, switch output leads 105, and pull-up resistors 106. The top label on each pushbutton gives the number of sharps or flats in the key signature to be actuated. The lower label gives the keynote.

When one of pushbuttons 103 is depressed, it latches down and releases the pushbutton that was previously latched down. Interlocked pushbutton arrays of this type are well known. Switch output leads 105 are normally held at the upper power supply potential by pull-up resistors 106, but when a switch is closed its output lead is grounded.

When reading music, if one encounters the key signature shown in FIG. 2, for example, one pushes the pushbutton for two sharps (shown in FIG. 22), grounding its output lead 105 which runs to AND gate 107 and lowering the potential of the D input 108 to the LANDMARK POSITIONER. This moves the D position in the display pattern of FIG. 7 (centered in the group of two landmarks) to the standard tonic digital no. 40, as shown in FIG. 8. At the same time on sets uniform pitch changer 100 (shown in FIG. 20) to the "+2" position, so that the musical output of all digitals is raised by two semitones. In particular, it makes the standard tonic digital no. 40 sound the desired D tone. The configuration of the keyboard ensures that the front digitals will now sound the diatonic scale in the key of D.

By pushing other pushbuttons 103 in FIG. 22, all fourteen key signatures can be actuated, as shown in FIGS. 14 and 15. Thus all diatonic notes will be played on the wide front digitals of the keyboard. The LANDMARK POSITIONER comprises the individual display control modules 110 shown in FIG. 7.

Referring again to FIG. 7, display control modules 110 are identical except for their connections to input leads 108 from the key signature selection circuits. Each control module 110 has five input leads and ten output leads. Circuitry of one of these display modules is shown in FIG. 23.

Referring to FIG. 23, input leads 198 are extracted from the seven leads 108 in the key signature selection circuits (FIGS. 22 and 7). These leads and their distributing leads 119 are labeled the same as the connected leads 108 for the particular display module labeled C in FIG. 7. The distributing leads 119 feed input leads to AND gates 120. Outputs from the AND gates feed buffers 121 with output leads 111 leading to the landmark modules. The ten output leads are numbered the same as the landmark elements that they darken. The particular input leads 198 and distribution leads 119 that can darken the ten different landmark elements are listed in FIG. 24. Referring to FIG. 24, for a landmark width of six elements, the two landmark elements numbered 5 and 6 could be combined into a single wide element needing only one input lead. For flexibility, however, all my elements are given the same width so that the landmark width can be reduced to five or four elements without changing the landmark modules. In FIG. 23, buffers 121 are powered by a low voltage power supply which delivers plus 2.1 volts with respect to ground. The power supply is shown in FIG. 25.

Referring to FIG. 25, power supply 126 delivers three positive voltages with respect to ground. Common lead 112 feeds the counter electrodes of all the landmark elements. The output leads 111 from buffers 121, in FIG. 23, are either 0.6 volt positive with respect to the common lead 112 or else 1.5 volt negative with respect to the common lead. A top view of one of the landmark modules is shown in FIG. 26.

Referring to FIG. 26, transparent cover plate 113 seals in ten display electrodes 115 which are numbered from 1 to 10. The ten elements of the display are separately supplied by leads 111 which, relative to the counter electrode, are either 0.6 volt positive (display elements white) or 1.5 volt negative (elements dark). Cross section views of the landmark module are shown in FIGS. 27 and 28.

Figure 27:
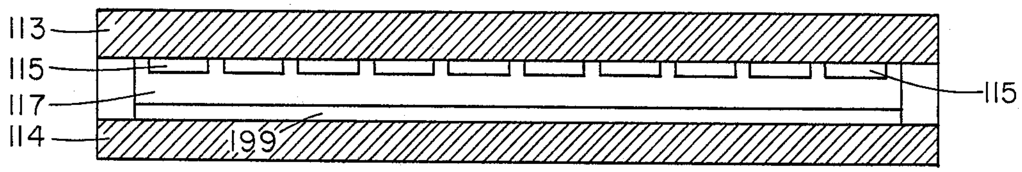

Referring to FIG. 27, glass cover plate 113 carries ten display electrodes 115; bottom plate 114 carries a counter electrode 199; and the module contains an electrolyte 117. When current is passed from the counter electrode to a display electrode, that display electrode turns blue. The cross sectional view in FIG. 28 shows more details.

Figure 28:
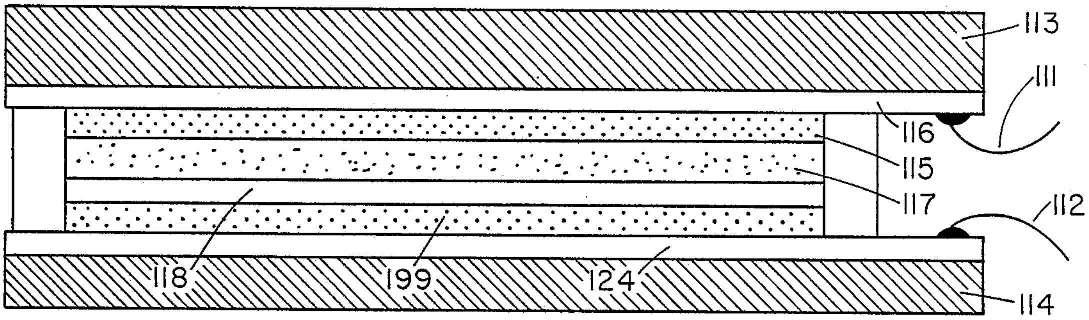

Referring to FIG. 28, cover plate 113 has ten individual transparent conductive films 116, such as indium oxide and tin oxide, formed on its lower surface. On each conducting film is formed a tungsten oxide electrochromic film 115 by a process described in U.S. Pat. No. 4,278,329, assigned to the Asahi Glass Company. Below this electrochromic layer is electrolyte 117 comprising $LiClO_4$ dissolved in an organic solvent such as propylenecarbonate. Bottom plate 114 has a single conductive film 124 formed on it. On this, a counter electrode 199 of tungsten oxide is formed as described in U.S. Pat. No. 4,278,329, Col. 7. Between the electrolyte and the counter electrode is inserted white reflector film 118 to reflect light incident from above. Lead 111 supplies current to the conducting film 116, and lead 112 supplies current to conducting bottom plate 114.

When lead 111 is made 0.6 volt positive with respect to lead 112, the landmark element appears white as viewed from above by reflected light. When lead 111 is made 1.5 volt negative with respect to lead 112, the landmark element appears blue as viewed from above by reflected light. The negative potential on display electrode 115 attracts lithium ions from the electrolyte to form blue impurity centers in the tungsten oxide in accordance with the equation $$\underset{\text{(Transparent)}}{WO_3} + xLi^+ + xe^- = \underset{\text{(Blue)}}{Li_xWO_3}$$

Figure 29:
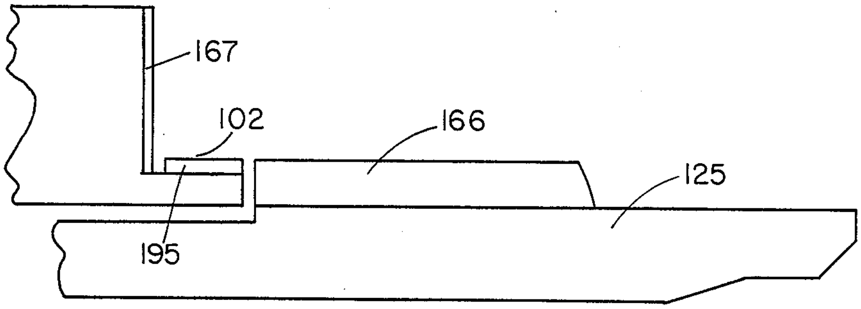

In order to increase the apparent size of the landmarks, a thin back surface mirror is mounted behind them, as shown in FIG. 29. Referring to FIG. 29, landmarks 102 are mounted on keyboard display strip 195 which is positioned behind and above back digitals 166 and front digitals 125. Mirror 167 produces images of the landmarks which have the effect of doubling their apparent size, thus effecting a closer simulation of the back digitals. In manufacture, the landmark modules are first attached to display strip 195, then the display strip is fixed to the keyboard. Since the display pattern moves along the keyboard in steps of length "d", the element-to-element spacing between corresponding elements of the landmark modules is made equal to "d", the digital-to-digital spacing between corresponding parts of the front digitals.

In FIGS. 20, 23, 25, reference numbers represent commercial components as follows:

120 represents AND gate HC11,

121 represents buffer HC241,

126 represents power supply ECD-PS20.

The gates and buffers are marketed by RCA and Texas Instruments Corporation. The power supply is marketed by the Optrex Division of the Asahi Glass Co.

Separate sound modules 99 are widely available. Several that include pitch chargers are:

| | |
|---|---|
| Yamaha | SPX90, |
| Korg | DVP-1, |
| Roland | MKS-7, |
| Kurzweil | 150. |

OTHER EMBODIMENTS

Figure 33:
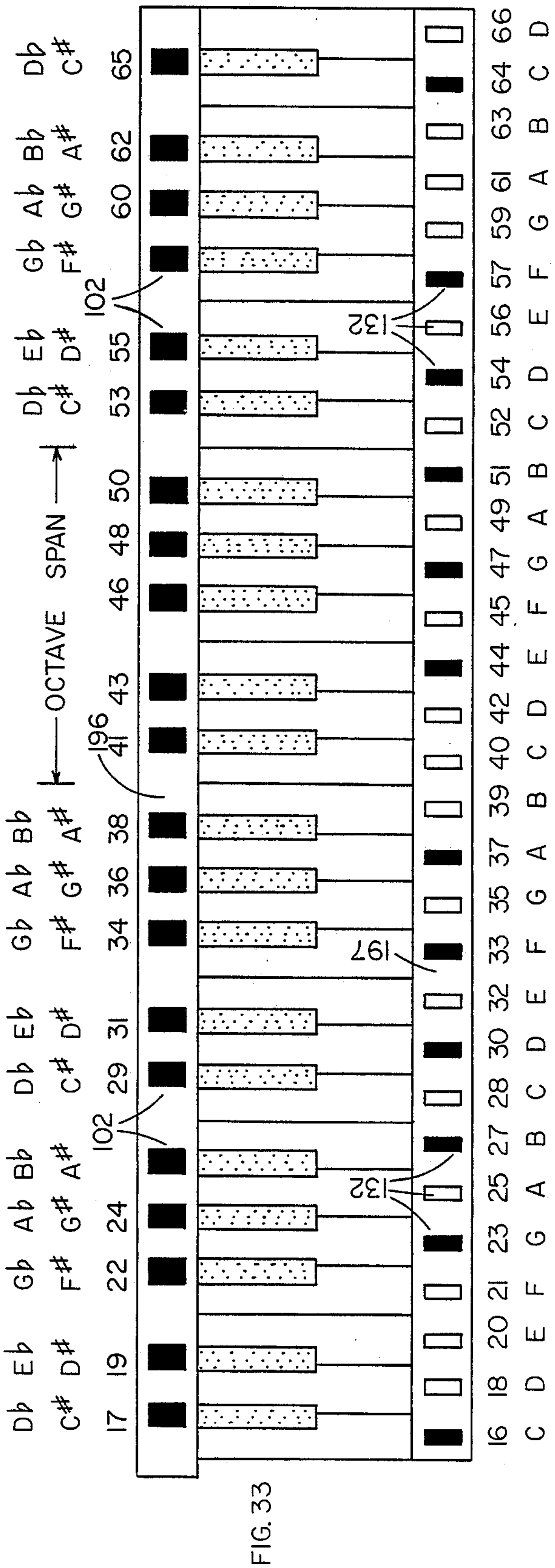
FIGS. 33, 34 show keyboard landmarks for the second embodiment.

For music students who have not become accustomed to using the back digitals as landmarks, better movable landmarks may be used. A direct translation of notes on a musical staff into position on the keyboard is creased by landmarks aligned with the front digitals that simulate staff lines of the written music, especially if the landmarks are accompanied by letter labels associated with the musical notes. Such landmarks are provided by a second embodiment of my invention. Referring to FIG. 33, rear landmarks 102 are mounted on keyboard display strip 196 which is positioned at the back of and above the keyboard. In addition, forward landmark elements 132 to represent musical staff lines are mounted on display strip 197, which is positioned in front of and slightly below the level of the front digitals, each landmark element aligned with one of the front digitals. The staff lines of written music have been represented on the keyboard previously by lights. Such representation does not closely simulate the staffs of written music, however, because the staffs are usually seen as black lines on a white background by reflection of light from the room. I therefore simulate the staff lines as closely as possible by means of electrically changeable landmark elements that can absorb incident light either strongly or weakly, thus appearing either dark or light by their reflection of light from the room.

The treble and bass staff lines and some ledger lines are represented by dark landmark elements. These electrically changeable elements are positioned to play music in the key of C. Here the bass staff is represented by dark landmark elements in front of digitals no. 23, 27, 30, 33, 37; the treble staff is represented by dark landmark elements in front of digitals no. 44, 47, 51, 54, 57.

Figure 34:
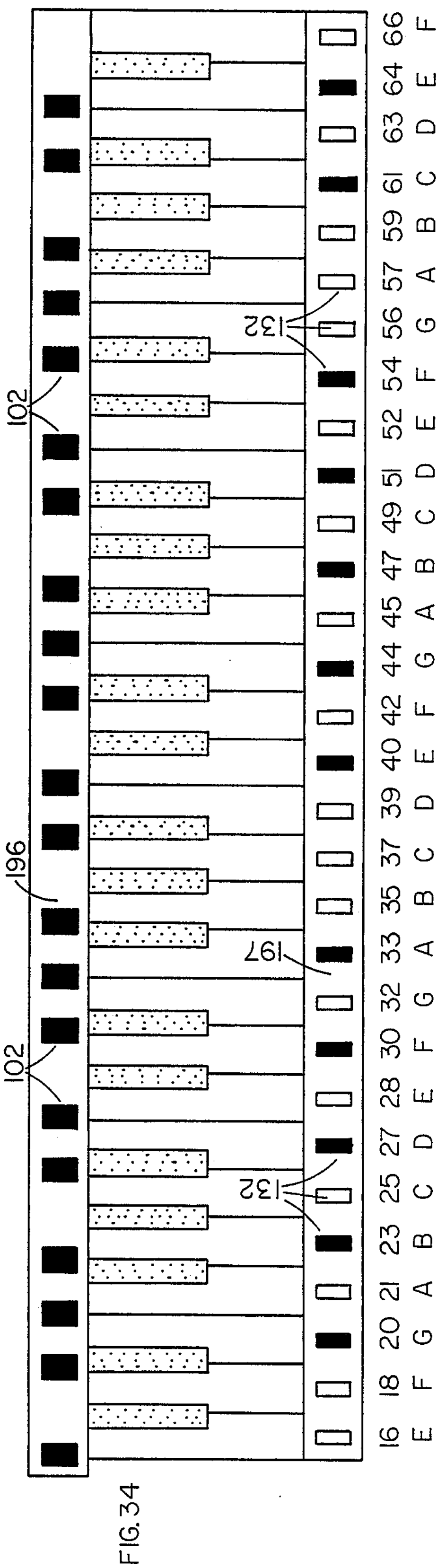

In order to play in the key of E, the E line of the treble staff is moved to the tonic digital no. 40, as shown in FIG. 34. At the same time, uniform pitch changer 100 in FIG. 20 is raised four semitones above standard pitch. Tonic digital no. 40 will now sound the E tone and the rest of the front digitals will play the diatonic scale in the key of E. Dark landmarks 102 representing the back digitals and the letter labels aligned with the front digitals move along with dark landmarks 132 representing the musical staff lines, the complete pattern of dark and light landmark elements being positioned by means of the key signature selector switch shown in FIG. 22. Electrochromic dot matrix characters which are suitable for large literal displays are marketed by the Asahi Glass Company. Since the whole display pattern moves along the keyboard in steps of length "d", the element-to-element spacing of corresponding elements of the dot matrix characters are made equal to "d", the digital-to-digital spacing of corresponding parts of the front digitals.

Figure 35:
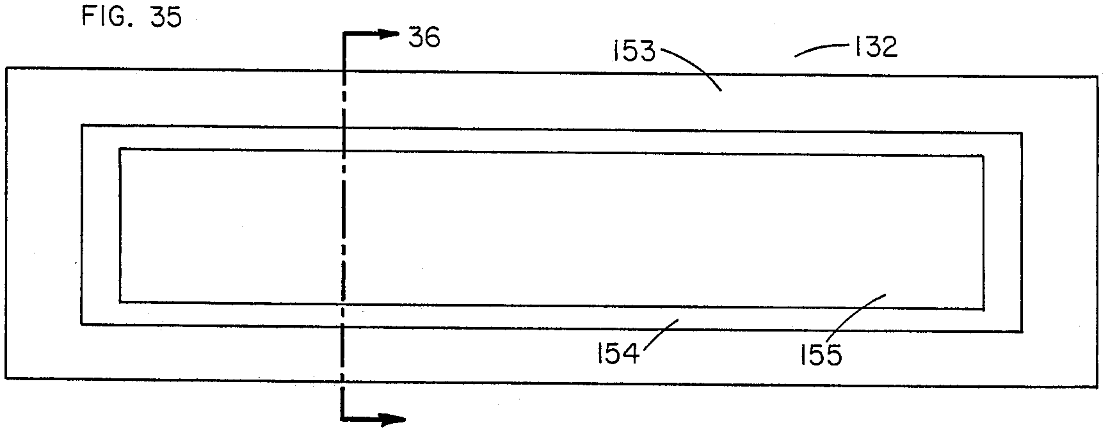
FIGS. 35, 36 show details of a landmark element for the second embodiment.
Figure 36:
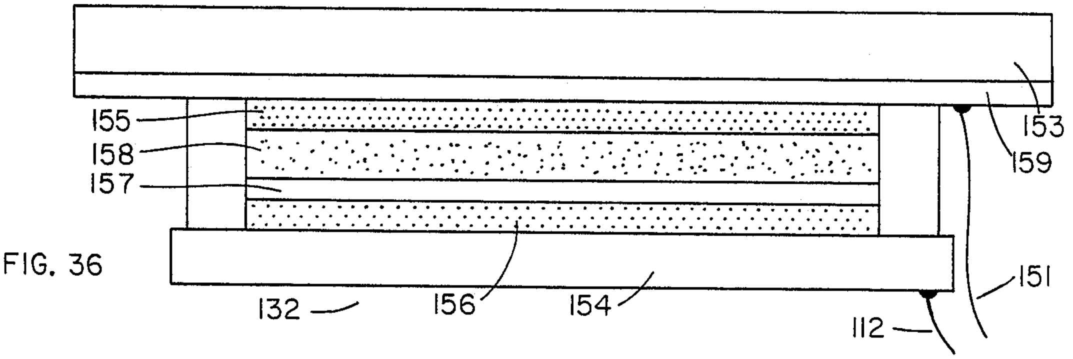

In FIGS. 8–13 the sharp and flat symbols with the letter labels where shown to demonstrate their exact correspondence to FIG. 6. These symbols are not needed in FIG. 34, because after pushing the key selector pushbutton one can ignore the symbols in the key signature—one simply plays the notes written in the body of the score. The digital numbers aligned with the digitals were shown in FIGS. 33, 34 in order to make clear the invention—they are not visible on the actual keyboard. A top view of one of landmark elements 132 is shown in FIG. 35. Referring to FIG. 35, transparent top plate 153 and bottom plate 154 enclose an electrochromic cell including display electrode 155. A cross-sectional view of the cell is shown in FIG. 36. The construction of this cell is similar to that shown in FIG. 28, the cell including a counter-electrode 156, white reflector 157, and electrolyte 158. Detailed positioning circuitry for the musical staff landmarks is shown in FIG. 38.

Figure 30:
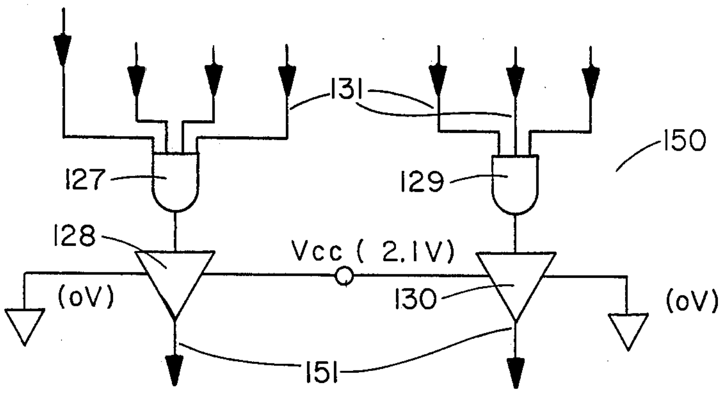
FIG. 30 shows a control module for a second embodiment.
Figure 38:
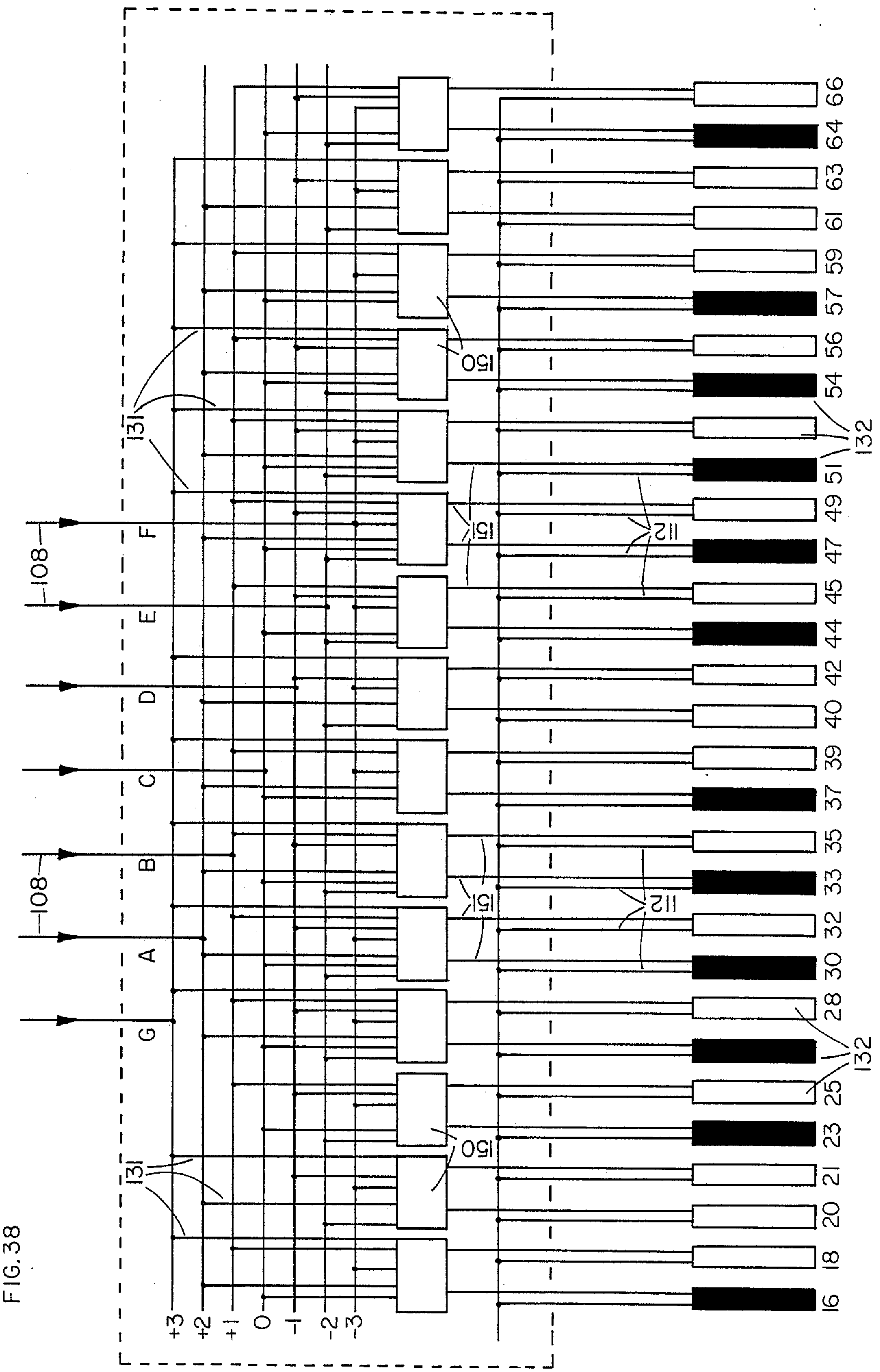
FIG. 38 shows landmark positioning circuitry for second and third embodiments.

Referring to FIG. 38, leads 108 from the key signature selector connect to display control modules 150, and each control module has two output leads 151 to a pair of adjacent landmark elements 132. The display control modules are all alike. A diagram of one is shown in FIG. 30. Referring to FIG. 30, each control module has seven input leads 131 and two output leads 151. The outputs of AND gates 127, 129 feed buffers 128, 130. These buffers also are powered by the 2.1 volt power supply shown in FIG. 25.

Figure 39:
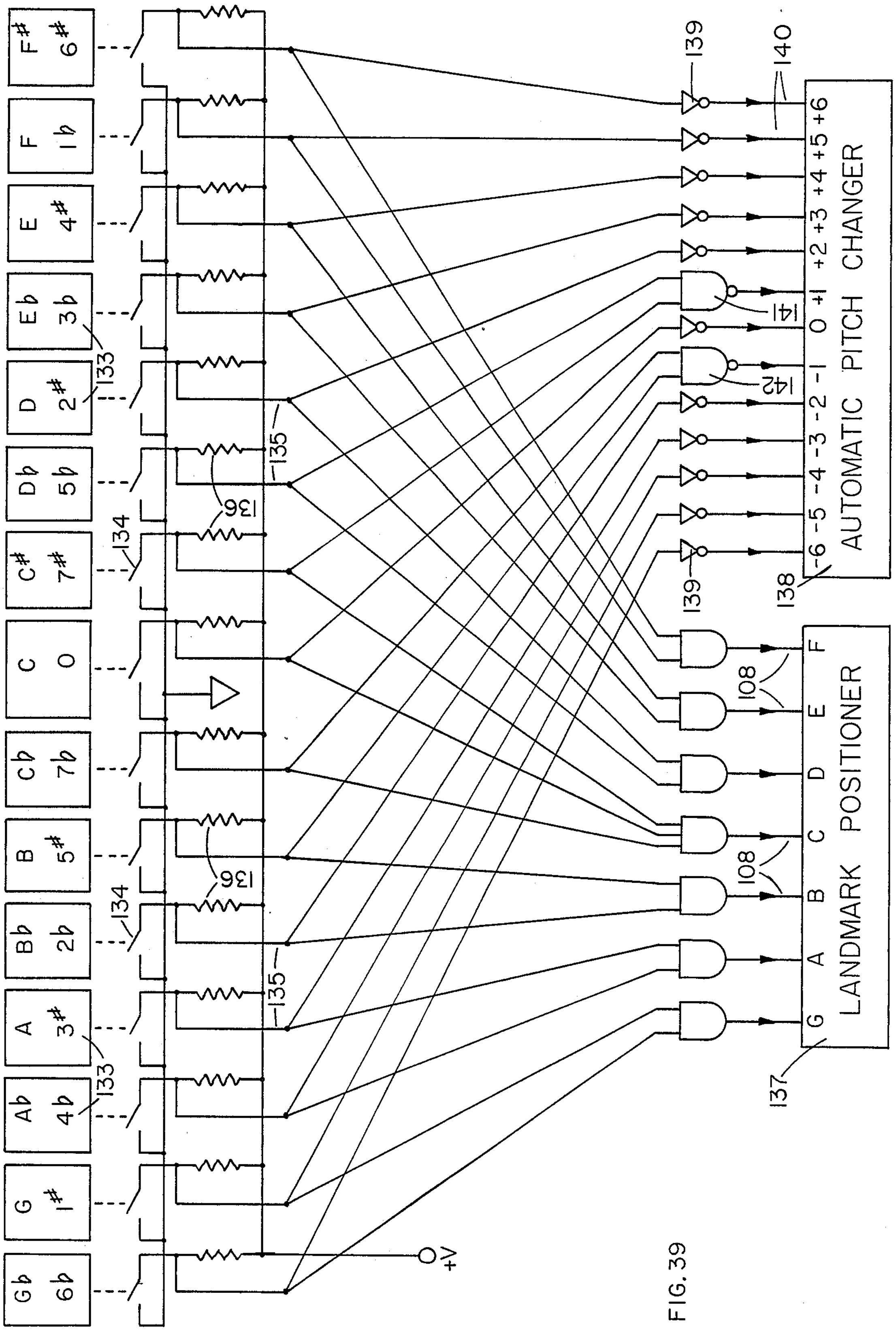
FIGS. 39, 40 show key signature selection circuits and an automatic pitch changer for the third embodiment.

A third embodiment of my invention includes an automated uniform pitch changer to keep the musical output at the intended pitch of the written music. Referring to FIG. 39, pushbutton array 133 is like that in the preferred embodiment except that the pushbuttons are rearranged to show their connections to the automatic pitch changer more clearly. Circuitry of landmark positioner 137 is similar to that in the second embodiment (shown in FIGS. 38 and 30).

In accordance with the key signature of the written music, the pattern of light and dark landmark elements is positioned by pushing one of pushbuttons 133 in FIG. 39, which grounds one of output leads 135. This acts on the landmark positioner 137. In addition, the signal on that output lead is inverted by one of inverters 139 or NAND gates 141, 142, producing a positive signal on one of input leads 140 to automatic pitch changer 138. The control pushbutton for the key of C sends a signal through the central one of inverters 139 to the automatic pitch changer which then produces standard overall output pitch.

The five pushbuttons for the keys of G♭, G, A♭, A, B♭ send signals through the five left-hand inverters 139, which uniformly lower the output pitch from 2 to 6 semitones below standard pitch. The five pushbuttons for the keys of D, E♭, E, F, F♯ send signals through the five right-hand inverters 139, which raise the output pitch from 2 to 6 semitones above standard pitch. The two pushbuttons for the keys of B and C♭ send signals through NAND gate 142 to their input lead 140 which lowers the output pitch by one semitone below standard pitch. The two pushbuttons for the keys of C♯ and D♭ send signals through NAND gate 141 to their input lead 140, which raises the pitch by one semitone above standard pitch.

Figure 40:
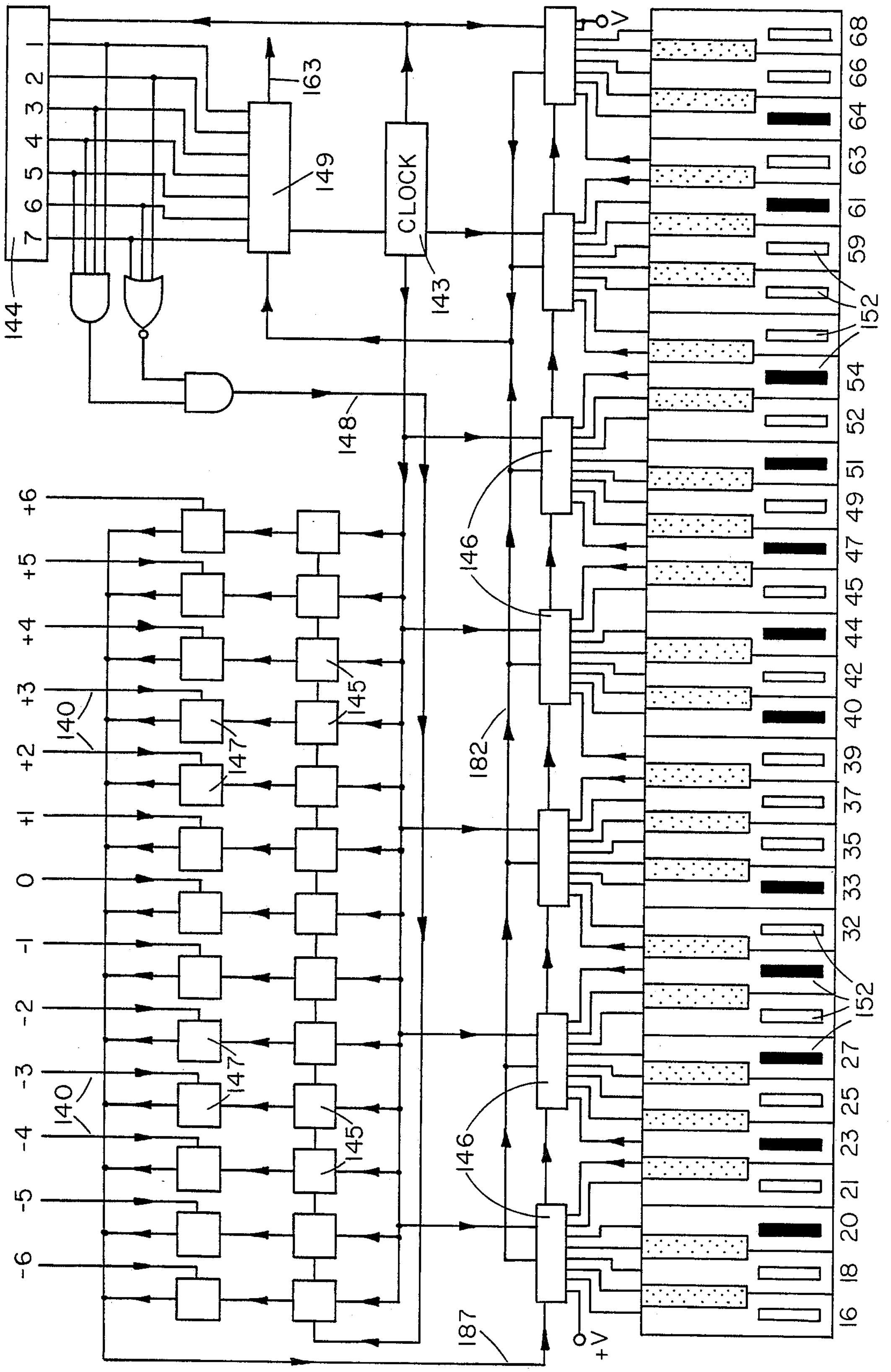

The landmarks are located on the front digitals, as shown in FIG. 40. Referring to FIG. 40, the pattern of light and dark landmark elements on the front digitals represents the bass and treble staffs of the written music, in this case positioned for the key of E. Construction of the landmark elements is similar to that shown in the second embodiment. Positioning of each landmark element in its front digital is shown in FIG. 41.

Figure 41:
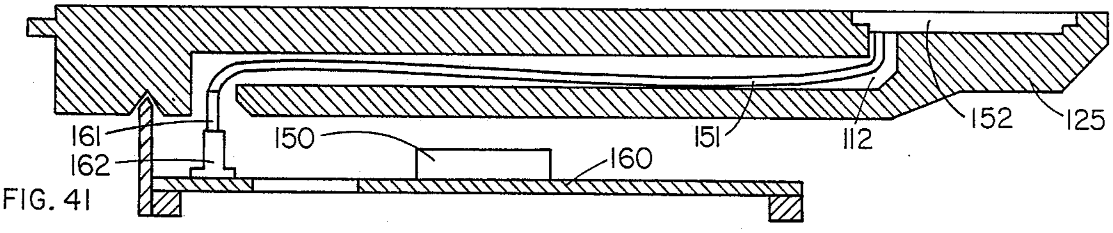
FIG. 41 shows positioning of a keyboard landmark element on a front digital.

Referring to FIG. 41, landmark element 152 is fastened into the top surface of front digital 125. Leads 151 and 112 come from plugs 161 which are inserted into sockets 162. These are mounted on printed circuit board 160, which also carries control modules 150.

The automated uniform pitch changer of the present embodiment takes advantage of the widespread practice of scanning the keyboard and multiplexing status signals from the individual digitals—so that pitch signals regarding depression of digitals can be transmitted on a single pair of twisted wires to a sound module. By introducing a variable delay into this keyboard scan, the pitch signal transmitted to the sound module from each digital can be raised above its standard pitch or lowered below its standard pitch. Circuitry for effecting an automatic and uniform change of pitch is diagrammed in FIG. 40.

Referring to FIG. 40, electronic clock 143 continuously sends clock pulses to seven stage binary counter 144, which repeatedly counts from zero to 127. These clock signals also clock the thirteen stage delay shift register 145, and the 56 stage time division multiplexer 146, which is distributed along the keyboard in seven sections of eight stages each. Input leads 140 from the key signature selector circuits transmit a positive "switch on" potential to one of the thirteen transmission gates 147. The "switch on" potential selects one of the outputs from delay shift register 145 to be sent on lead 187 to the input of multiplexer 146. This multiplexer continually scans the 53 digitals of the keyboard to detect when each digital is depressed and when it is released. Whenever a keyboard digital is depressed a corresponding signal is sent on multiplexer bus 182 to note transmitter 149. The pitch number on binary counter 144 for each "note on" and "note off" event is transmitted through transmitter 149 to the sound module, these pitch signals being used to sound tones of the appropriate pitch and duration.

Figure 37:
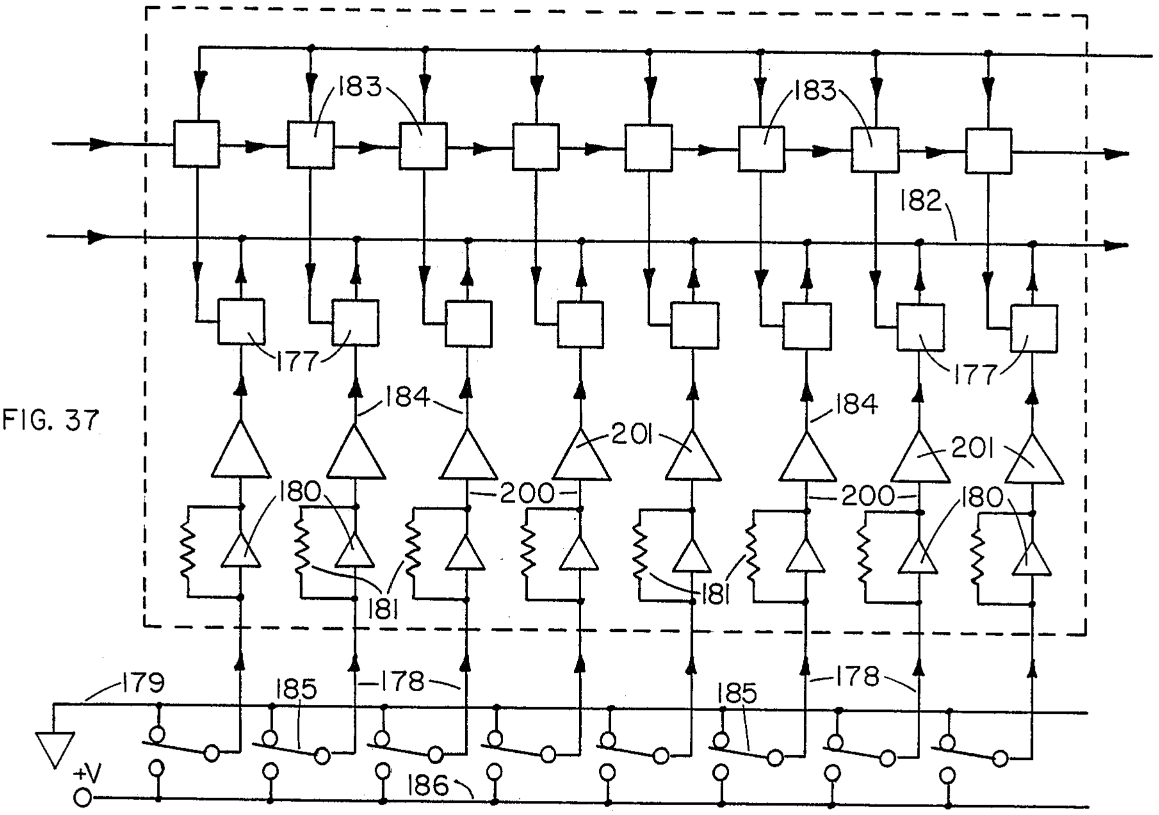
FIG. 37 shows keyboard digital switches and a multiplexer module for a third embodiment.

The seven sections of multiplexer 146 are identical. One of these sections is diagramed in FIG. 37, within the dotted rectangle. In FIG. 37, the eight-stage shift register section 183 normally has a low output from each stage, but during each keyboard scan a single enabling bit traverses the register from left to right, momentarily giving a positive output voltage from each stage that enables transmission gates 177 in time sequence, allowing them to detect whether their associated keyboard digitals are depressed. When a keyboard digital is depressed its associated lead 184 becomes positive, and a corresponding signal is sent in its time slot on multiplexer bus 182 to note transmitter 149 shown in FIG. 40.

Referring still to FIG. 37, in order to eliminate the effects of contact bounce and vibration, digital switches 185 make contact with two busbars 186, 179 held at the upper and lower power supply potentials. When a keyboard digital is not depressed its associated digital switch output lead 178 is held at ground potential by switch contact with busbar 179. This output lead feeds the input of one of non-inverting D.C. amplifiers 180, whose output is fed back to its input through one of feedback resistors 181. The positive feedback latches the input potentials, so that while a digital is being depressed its switch output lead 178 is held at ground potential. When the keyboard digital is fully depressed, its output lead 178 is forced by busbar 186 to the upper power supply potential, where it remains until the keyboard digital is released and switch contact with ground busbar 179 is restored.

The D.C. amplifiers 180 have a high input resistance, so that they draw negligible power except during "note on" and "note off" events. The energy dissipated by the amplifiers during these events can be limited by making their output resistance rather high, in which case output leads 200 can be connected directly to their amplifier input, instead of through external resistors 181.

Outputs from the D.C. amplifiers 180 travel through buffers 201, and momentarily through transmission gates 177 and multiplex bus 182 to the note transmitter shown in FIG. 40.

Referring again to FIG. 40, each time binary counter 144 reaches a count of 29 it sends a scan start pulse on lead 148 to delay shift register 145. In the key of C the input lead 140 labeled "0" would be positive, actuating its associated transmission gate 147, so that at the count of 35 a positive pulse on lead 187 from delay shift register 145 is sent to the input of multiplexer 146. The pulse traverses the multiplexer scan register and reaches standard tonic digital no. 40 at the count of 60 on counter 144. This pitch number, in binary code, is available in note transmitter 149, which transmits a pitch signal on lead 163 to the sound module whenever a keyboard digital is depressed or released. The technology of Musical Instrument Digital Interface (MIDI) is well known, the specification for transmission of pitch signals from keyboard to sound module being published in the United States by the MIDI Manufacturers Association and by the International MIDI Association. The pitch number 60 which is transmitted in binary code to the sound module for the tone of middle C is in accordance with the MIDI specification.

In the key of D the input lead 140 labeled "+2" becomes positive, so that the keyboard scanning pulse is delayed by two more clock counts in delay shift register 145, reaching standard tonic digital no. 40 at the count of 62 on counter 144. In accordance with the MIDI specification, tramsmitted pitch number 62 makes the sound module generate the tone of middle D. This is the proper tone for tonic digital no. 40 to sound when playing in the key of D. If the G pushbutton in the key signature actuator is depressed, the keyboard scanning pulse has a reduced delay in the delay shift register so that it reaches standard tonic digital no. 40 at the count of 55 on counter 144. In accordance with the MIDI specification, transmitted pitch number 55 makes the sound module generate the tone of low G. This is the proper tone for tonic digital no. 40 to sound when playing in the key of G.

Thus when my key signature actuator is set to actuate a particular key signature in written music, the keyboard landmarks are moved so as to position its keynote at a tonic digital—and the musical output pitch is automatically adjusted so that the musical composition will sound at the intended pitch of the written music.

In general, when the output pitch is to be uniformly raised by N semitones, the pitch number (PN) will be related to the digital number (DN) on my keyboard by the equation $$PN=DN+20+N.$$

When the output pitch is to be uniformly lowered by N semitones the pitch number will be related to the digital number on my keyboard by the equation $PN=DN+20-N.$ The relationship of N to movement of the pattern of landmarks is the same as listed in FIGS. 16–19 for the preferred embodiment. Thus when the landmarks are moved a distance Md to the left of their standard position, N, the automatic and uniform increase of pitch, is 2M or 2M−1 semitones, depending on whether the key signature contains sharps or flats. On the other hand, when the landmark pattern is moved a distance Md to the *right* of its standard position the automatic *decrease* of pitch is either 2M or 2M−1 semitones, depending on whether the key signature contains flat or sharps.

Many commercially available sound modules are equipped to receive MIDI transmission. Several that have internal pitch changers of their own have been listed for the preferred embodiment. When the pitch change shown in FIGS. 16–19 is made automatically by the key signature actuator, then I preferably use a sound module such as the Korg EX-8000 which does not contain a pitch changer. On the other hand, if a musician should use one of the previously listed sound modules which contains a pitch changer, than its operation would be independent of the key signature actuator. Thus my key signature actuator makes keyboard playing easier at the intended pitch of the written music: the pitch changer in the sound module would serve to uniformly change the output pitch *from* the intended pitch of the written music, in order to accommodate a particular singer or fellow musician.

Figure 32:
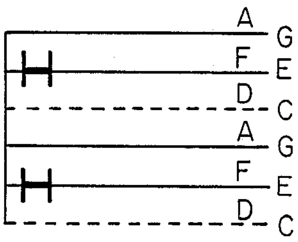
FIGS. 31, 32 show three-line musical staffs.
Figure 31:
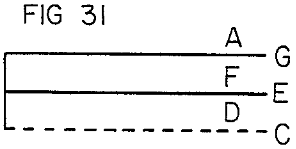

The electrically changeable keyboard landmarks can also be used for teaching music on a musical keyboard, and to guide keyboard playing of music written in different notations. For example, beginning music pupils are often introduced to music on a 3-line musical staff on a teacher's display panel or written on paper, as shown in FIG. 31. Referring to FIG. 31, the letters used to label the lines and spaces have their traditional meaning, but there is no place for the B note. Omission of the B note from the musical scale allows two or more 3-line staffs to be juxtaposed to form a continuum, as shown in FIG. 32. Referring to FIG. 32, each note has the same position in each octave, being always on a line or always in a space—a result of basing the notation on a musical scale containing an even number of notes, rather than an odd number of notes. This "hexachord" scale allows a more intimate relationship between the sounds of music and their representation on paper. Several other advantages of hexachord notation are described in my copending patent application Ser. No. 736,701.

The fourth embodiment of my invention enables a music student to start learning music on a musical keybord using landmarks representing a single 3-line musical staff. He then progresses to multiple 3-line staffs. Finally, he is introduced to 5-line staffs so that he can also play the large body of music presently published in the traditional notation.

Figure 42:
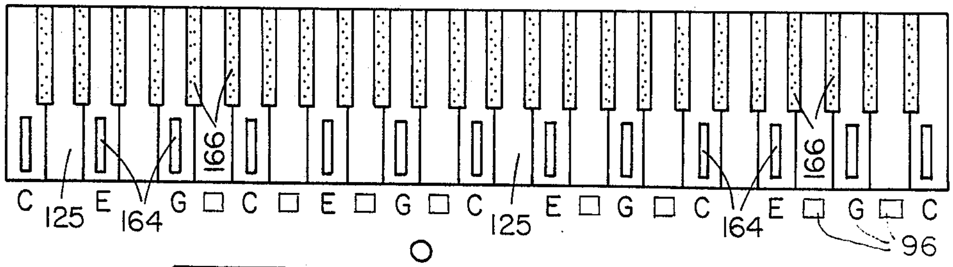
FIGS. 42, 43 show a keyboard and its landmark control for a fourth embodiment.

Referring to FIG. 42, a uniform keyboard has front and back digitals alternating throughout four octave spans. Electrochromic landmark elements 164 embedded in every other front digital are similar to those used in the third embodiment of my invention, and electrically changeable alpha-numeric characters 96 are aligned with each of the front digitals. In FIG. 42 the front digitals are identified by three letter labels per octave span, corresponding to the labels of the staff lines shown in FIG. 32. If only these letters were used, a single lead would suffice for each letter, but for flexibility I provide dot matrix characters and multiple leads to each character. The technology of such alphanumeric displays is well known. The Asahi ECD-CT1 display controller is designed to control their electrochromic dot matrix characters. Landmark elements 164 mounted on the front digitals are controlled by circuitry shown in FIG. 43.

Figure 43:
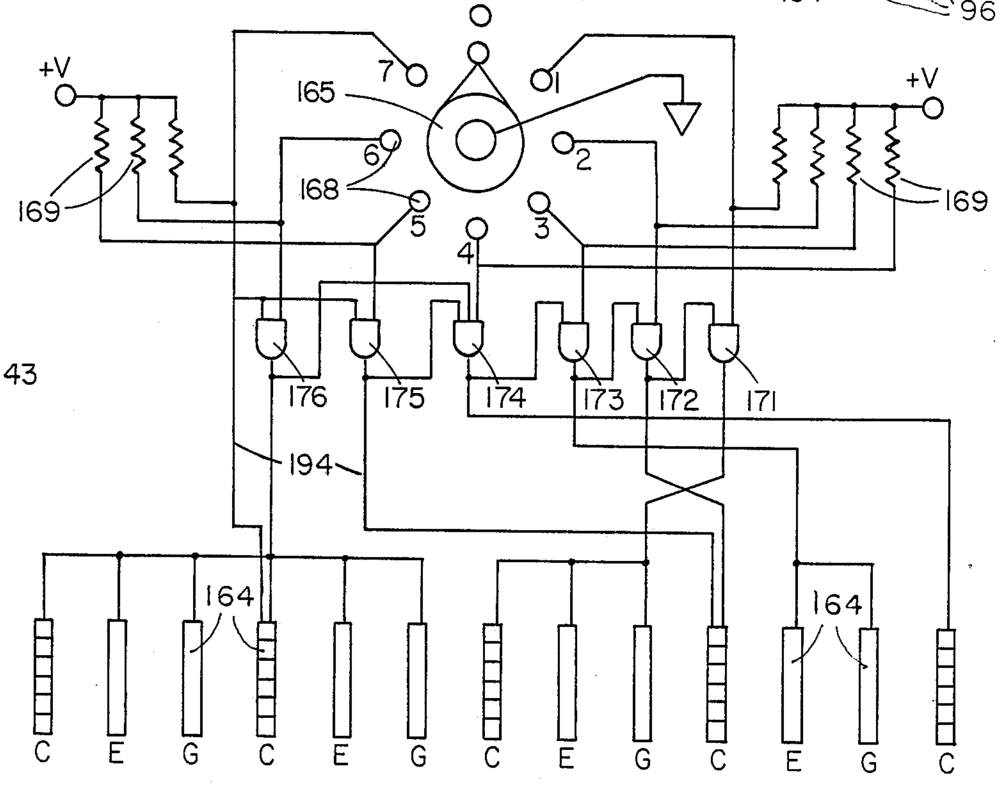

Referring to FIG. 43, rotary switch 165 has seven different active positions. Seven contacts 168 are normally held at a potential of +2.1 volts by pull-up resistors 169, but any one of these can be forced to ground potential by switch 165.

Figure 45:
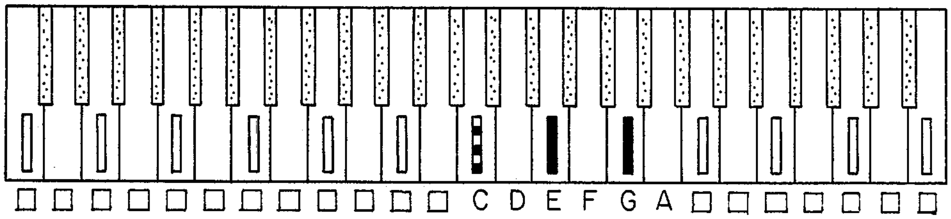
FIGS. 45–50 show different arrangements of keyboard landmarks in the fourth embodiment.

In position 1 of switch 165 the output of AND gate 171 is brought to ground potential, thereby displaying three dark landmark lines as shown in FIG. 45. The first landmark line, which is dotted, is on a digital labeled "C", which plays the note of middle C. This set of three landmark lines corresponds to a 3-line musical staff in written music as shown in FIG. 31. The letter labels for these three lines and for the spaces above them are also displayed. Attention is focussed on the six front digitals labeled C–A until the pupil has learned by practice to recognize and to sing the musical intervals of minor thirds, fourths, and fifths.

Figure 46:
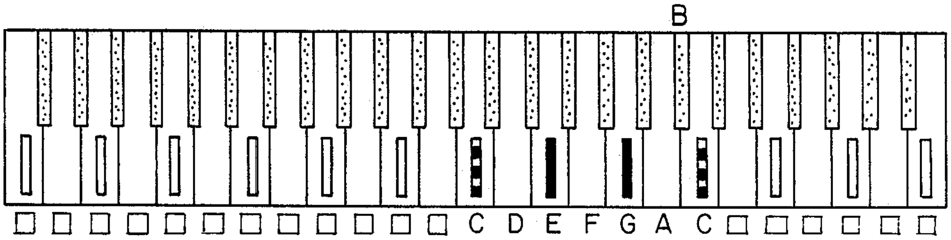

In position 2 of switch 165 the output of AND gate 172 is additionally grounded to add the octave interval. The leading tone is relegated to a back digital and relabeled C♭ as shown in FIGS. 46–48.

Figure 47:
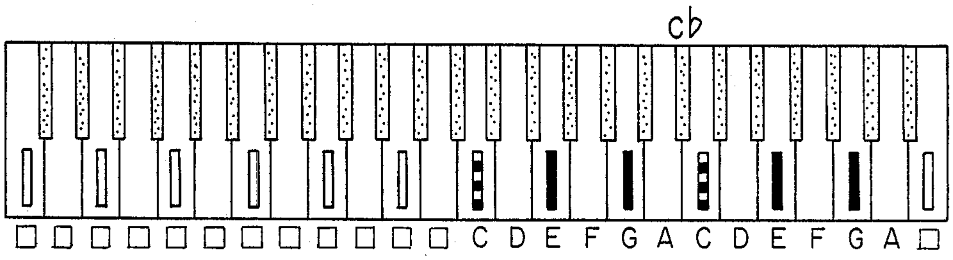

In position 3 of switch 165, the outputs of AND gates 171, 172, 173 are grounded to display six landmark lines as shown in FIG. 47. This set of six landmark lines represents two 3-line musical staffs as shown in FIG. 32, for music written in hexachord notation. In position 4 of switch 165, AND gate 174 is additionally grounded to display a third dotted landmark line on a digital playing the C note.

Figure 48:
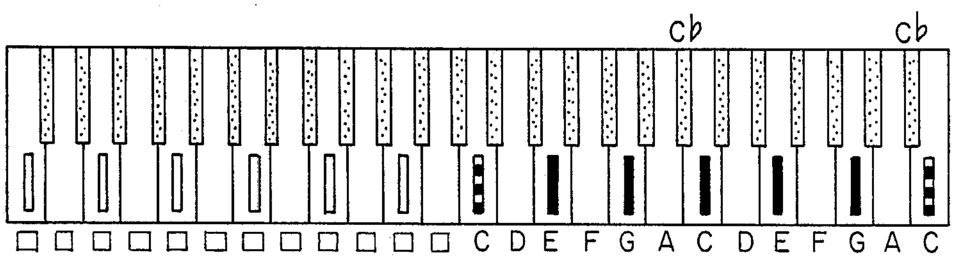
Figure 49:
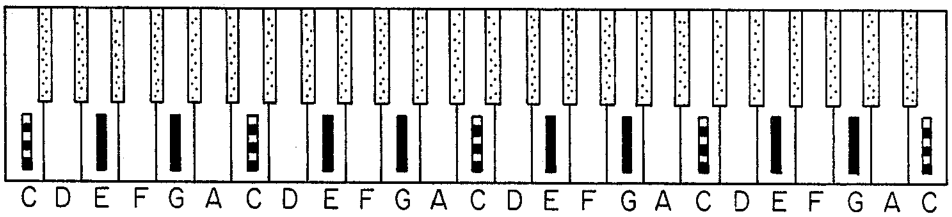
Figure 50:
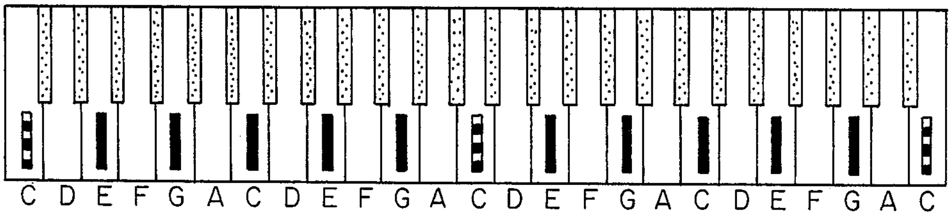

In position 5 of switch 165, the outputs of AND gates 171–175 are grounded to display a single 5-line staff as shown in FIG. 48. In position 6 of switch 165 the outputs of AND gates 176 and 171–174 are grounded to display four 3-line staffs as shown in FIG. 49, In position 7 of switch 165 the outputs of the same AND gates and leads 194 are grounded so that two of the dotted lines are converted into solid lines. This changes the four 3-line staffs into two 5-line staffs, as shown in FIG. 50.

The letter labels aligned with the front digitals are changed along with the landmarks, as seen by a comparison of FIGS. 42 and 45 to 49. When positioning these dot matrix characters, the element-to-element spacing between corresponding elements of the matrices is made equal to the digital-to-digital spacing between corresponding parts of the front digitals. Two of the dotted landmarks shown in FIGS. 47 AND 49 are converted into solid dark landmarks in FIGS. 48 and 50. These landmarks are constructed as shown in FIG. 44.

Figure 44:
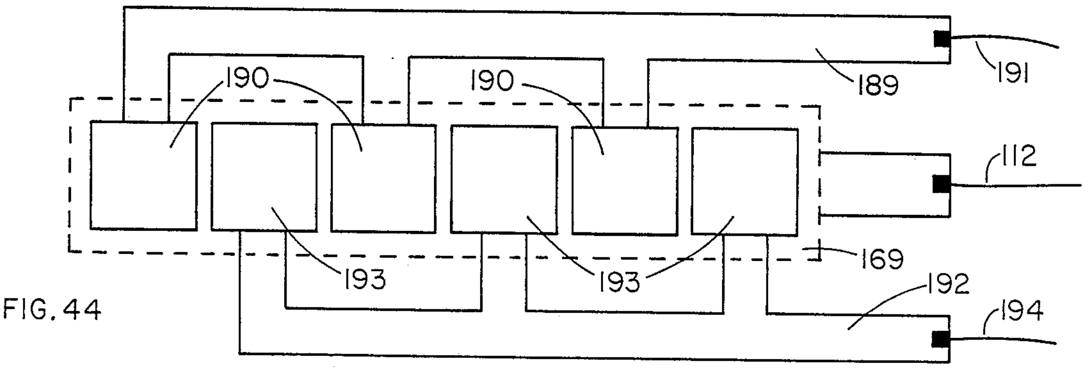
FIG. 44 shows a landmark module for the fourth embodiment.

Referring to FIG. 44, transparent conducting film 189 connects three small square display electrodes 190 to lead 191. Transparent conducting film 192 connects the other three display electrodes 193 to lead 194. The counter electrode, shown dotted, is connected to the common lead 112. The display and counter electrodes are formed in the same way as described for the preferred embodiment. The electrochromic cell also contains a white reflector film and an electrolyte as in the preferred embodiment.

Although the simplest expression of hexachord notation is on three-line staffs, five-line staffs have the advantage of compatibility with the traditional keyboard notation. When a musician trained in hexachord notation has become accustomed to five-line staffs he can, by throwing a scale-changing switch, also play music written in the traditional notation. He need not learn the traditional labels for the lines and spaces of the bass and treble staffs. A hexachord-to-diatonic scale changing switch, together with suitable key signature actuators, is described in my copending patent application Ser. No. 736,701.

Other embodiments of my invention use other types of landmark elements which can appear either light or dark by reflected light. My copending patent application Ser. No. 736,701 from page 23, line 25 to page 28, line 5 describes the use of liquid crystal displays as electrically changeable keyboard landmarks. They are used for playing music written in both traditional and non-traditional notations on the same keyboard, which has alternating front and back digitals as in FIG. 42 of the present application.

Still other materials can be used in non-emissive landmarks. For examples the ferroelectric materials described in U.S. Pat. Nos. 4,379,621 and 4,556,727 can be used, and the Solid Ceramic Display elements marketed by Motorola. All of these display elements have first and second visual states—in the first state the element absorbs light strongly so that it appears dark, in the second state the element absorbs light weakly so that it appears to have a light shade.

In my automatic key signature actuator, the distinction between the two visual states of the electrically changeable landmark elements is not necessarily that of absorbing incident light strongly or weakly. The distinction can be between two different colors, as in the liquid crystal diplays manufactured by the Epson and Seiko Corporations. The distinction can also be between being luminous and being non-luminous, as disclosed in my U.S. Pat. No. 3,141,371, col. 9, line 70 to col. 10, line 53.

The coupling between the keyboard and the sound module is not necessarily a MIDI connection. If the sound generation is close to or within the keyboard, the fifty-three digital switches can be connected to fifty-three separate wires transmitting 5 volt DC pitch signals through a uniform pitch changer to a set of sixty-six separate audio frequency oscillators. A suitable uniform pitch changer switch is described by Wick in U.S. Pat. No. 3,030,348. On the other hand, if the sound module is remote from the keyboard, the status signals from the digital switches can be multiplexed and their coded pitch signals sent to a sound module by radio transmission, as described by Stavrou et al in U.S. Pat. No. 4,099,437.

I claim:

1. An improved keyboard landmark display for orienting a musician on a musical keyboard in a lighted environment, the keyboard having a plurality of twenty-one front digitals and a plurality of fifteen back digitals, the front and back digitals being arranged in a sequence running from left to right in a periodic pattern with a period of twelve digitals, any twelve consecutive digitals of the keyboard occupying a constant distance of an octave span along the keyboard, within a particular octave span the first, third, fifth, sixth, eighth, tenth and twelfth digitals being front digitals, the second, fourth, seventh, ninth and eleventh digitals being back digitals, the improvement comprising:

a plurality of electrically changeable landmark elements disposed along the keyboard, element-to-element spacing of the landmark elements being related to the digital-to-digital spacing of the keyboard digitals, each of the elements capable of existing in first and second visual states, in its first state the element absorbing incident light strongly so that by reflected light the element appears dark, in its second state the element absorbing incident light weakly so that by reflection the element appears to have a light shade.

2. The keyboard landmark display of claim 1 further comprising:

electrical means for bringing each of the electrically changeable landmark elements into its first visual state, electrical means for bringing each of the electrically changeable landmark elements into its second visual state, electrical means for creating a pattern of the light and dark landmark elements, a landmark positioner that can position the pattern of light and dark landmark elements in a standard position and can move the pattern of light and dark landmark elements bodily in each direction along the keyboard from its standard position by a distance Md, where d is a distance equal to one seventh of an octave span and M is an integer having the values one to three inclusive, means for transmitting pitch signals from each of the keyboard digitals.

3. The keyboard landmark display of claim 2 further comprising:

an automatic pitch changer that sets the pitch of each of the pitch signals at its standard pitch when the landmark pattern is in its standard position and that automatically and uniformly raises the pitches of the pitch signals by N semitones above their standard pitches when the landmark pattern is moved a distance Md to the left of its standard position, where N is a number in the range $2M-1$ to $2M$ inclusive.

4. The keyboard landmark display of claim 2 further comprising:

an automatic pitch changer that sets the pitch of each of the pitch signals at its standard pitch when the landmark pattern is in its standard position and that automatically and uniformly lowers the pitches of the pitch signals by N semitones below their standard pitches when the landmark pattern is moved a distance Md to the right of its standard position, where N is a number in the range $2M-1$ to $2M$ inclusive.

5. An improved keyboard landmark display for orienting a musician on a musical keyboard in a lighted environment, the keyboard having a plurality of twenty-one front digitals and a plurality of at least fifteen back digitals, the improvement comprising:

a plurality of electrically changeable landmark elements disposed along the keyboard, element-to-element spacing of the landmark elements being related to the digital-to-digital spacing of the keyboard digitals, each of the landmark elements capable of existing in first and second visual states, in its first state the element absorbing incident light strongly so that by reflected light the element appears dark, in its second state the element absorbing incident light weakly so that by reflection the element appears to have a light shade.

6. The keyboard landmark display of claim 5 in which the front and back digitals are arranged in a sequence running from left to right in a periodic pattern with a period of twelve digitals, any twelve consecutive digitals of the keyboard occupying a constant distance of an octave span along the keyboard, within a particular octave span the first, third, fifth, sixth, eighth, tenth and twelfth digitals being front digitals, the second, fourth, seventh, ninth and eleventh digitals being back digitals, the landmark display further comprising:

electrical means for bringing each of the landmark elements into its first visual state, electrical means for bringing each of the landmark elements into its second visual state, electrical means for creating a pattern of the light and dark landmark elements, a landmark positioner that can position the pattern of light and dark landmark elements in a standard position and can move the pattern of light and dark landmark elements bodily in each direction along the keyboard from its standard position by a distance Md, where d is the distance equal to one seventh of octave span and M is an integer having the values one to three inclusive, means for transmitting pitch signals from each of the keyboard digitals.

7. The keyboard landmark display of claim 6 further comprising:

an automated uniform pitch changer that sets the pitch of each of the pitch signals at its standard pitch when the landmark pattern is in its standard position and that automatically and uniformly raises the pitches of the pitch signals by N semitones above their standard pitches when the landmark pattern is moved a distance Md to the left of its standard position, where N is a number in the range $2M-1$ to 2M inclusive.

8. The keyboard landmark display of claim 6 further comprising:

an automated uniform pitch changer that sets the pitch of each of the pitch signals at its standard pitch when the landmark pattern is in its standard position and that automatically and uniformly lowers the pitches of the pitch signals by N semitones below their standard pitches when the landmark pattern is moved a distance Md to the right of its standard position, where N is a number in the range $2M-1$ to 2M inclusive.

9. A keyboard landmark display for orienting a musician in a lighted environment on a musical keyboard having thirty-six digitals which comprises:

(a) display strip for juxtaposition to the keyboard, to be fixed in position relative to the keyboard, the strip oriented parallel to the length of the keyboard; and (b) a plurality of electrically changeable landmark elements fixed to the display strip, element-to-element spacing of the landmark elements being related to the digital-to-digital spacing of the keyboard digitals, each of the electrically changeable landmark elements capable of existing in first and second visual states, in its first state the element absorbing incident light strongly so that by reflected light the element appears dark, in its second state the element absorbing incident light weakly so that by reflection the element appears to have a light shade.

10. The keyboard landmark display of claim 9 in which the thirty-six digitals consist of a row of twenty-one front digitals and a row of fifteen back digitals, the front and back digitals being arranged in a sequence running from left to right in a periodic pattern with a period of twelve digitals, any twelve consecutive digitals of the keyboard occupying a constant distance of an octave span along the keyboard, within a particular octave span the first, third, fifth, sixth, eighth, tenth and twelfth digitals being front digitals, the second, fourth, seventh, ninth and eleventh digitals being back digitals.

11. An improved musical keyboard having a plurality of twenty-one front digitals and a plurality of at least fifteen back digitals, each of the back digitals being positioned between two adjacent members of the plurality of front digitals, the improvement comprising:

a plurality of electrically changeable landmark elements mounted on the front digitals, to orient the player in a lighted environment, each of the landmark elements capable of existing in first and second visual states, in its first state the element absorbing incident light strongly so that by reflected light the element appears dark, in its second state the element absorbing incident light weakly so that by reflection the element appears to have a light shade.

12. The musical keyboard of claim 11 in which the front and back digitals are arranged in a sequence running from left to right in a periodic pattern with a period of twelve digitals, any twelve consecutive digitals of the keyboard occupying a constant distance of one octave span along the keyboard, within a particular octave span the first, third, fifth, sixth, eighth, tenth and twelfth digitals being front digitals, the second, fourth, seventh, ninth and eleventh digitals being back digitals.

13. The musical keyboard of claim 11 having twenty-two back digitals, each of the front digitals having a backward extension which is positioned between two immediately adjacent back digitals, the front and back digitals alternating throughout the keyboard.

14. An improved key signature actuator for a musical keyboard having a plurality of twenty-one front digitals and a plurality of fifteen back digitals, the front and back digitals being arranged in a sequence running from left to right in a periodic pattern with a period of twelve digitals, any twelve consecutive digitals of the keyboard occupying a constant distance of an octave span along the keyboard, within a particular octave span the first, third, fifth, sixth, eighth, tenth and twelfth digitals being front digitals, the second, fourth, seventh, ninth and eleventh digitals being back digitals, the keyboard having means for transmitting pitch signals from each of the keyboard digitals; the improvement comprising:

a plurality of electrically changeable landmark elements disposed along the keyboard, element-to-element spacing of the landmark elements being related to the digital-to-digital spacing of the keyboard digitals, each landmark element capable of existing in first and second visual states, electrical means for bringing each of the elements into its first visual state, electrical means for bringing each of the elements into its second visual state, electrical means for creating a pattern of the landmark elements in their first and second visual states, a landmark positioner that can position the pattern of landmark elements in a standard position and can move the pattern of landmark elements bodily leftward along the keyboard from its standard position by a distance Md, where d is a distance equal to one seventh of an octave span and M is an integer having the values one to three inclusive, an automatic uniform pitch changer that sets the pitch of each of the pitch signals at its standard pitch when the landmark pattern is in its standard position, a key signature selector for selecting a key signature and for automatically controlling the landmark positioner and the pitch changer, when the landmark pattern is moved a distance Md to the left of its standard position the pitches of the transmitted pitch signals being automatically and uniformly raised by N semitones above their standard pitches, where N is a number in the range 2M−1 to 2M inclusive.

15. An improved key signature actuator for a musical keyboard having a plurality of twenty-one front digitals and a plurality of fifteen back digitals, the front and back digitals being arranged in a sequence running from left to right in a periodic pattern with a period of twelve digitals, any twelve consecutive digitals of the keyboard occupying a constant distance of an octave span along the keyboard, within a particular octave span the first, third, fifth, sixth, eighth, tenth and twelfth digitals being front digitals, the second, fourth, seventh, ninth and eleventh digitals being back digitals, the keyboard having means for transmitting pitch signals from each of the keyboard digitals; the improvement comprising:

a plurality of electrically changeable landmark elements disposed along the keyboard, element-to-element spacing of the landmark elements being related to the digital-to-digital spacing of the keyboard digitals, each landmark element capable of existing in first and second visual states, electrical means for bringing each of the elements into its first visual state, electrical means for bringing each of the elements into its second visual state, electrical means for creating a pattern of the landmark elements in their first and second visual states, a landmark positioner that can position the pattern of landmark elements in a standard position and can move the pattern of landmark elements bodily rightward along the keyboard from its standard position by a distance Md, where d is a distance equal to one seventh of an octave span and M is an integer in the range one to three inclusive, an automatic uniform pitch changer that sets the pitch of each of the pitch signals at its standard pitch when the landmark pattern is in its standard position, a key signature selector for selecting a key signature and for automatically controlling the landmark positioner and the pitch changer, when the landmark pattern is moved a distance Md to the right of its standard position the pitches of the transmitted pitch signals being automatically and uniformly lowered by N semitones below their standard pitches, where N is a number in the range 2M−1 to 2M inclusive.

16. An improved keyboard landmark display for orienting a musician on a musical keyboard, the keyboard having a plurality of twenty-one front digitals and a plurality of fifteen back digitals, the front and back digitals being arranged in a single sequence running from left to right in a periodic pattern with a period of twelve digitals, any twelve consecutive digitals occupying a constant distance of an octave span along the keyboard, within a particular octave span the first, third, fifth, sixth, eighth, tenth and twelfth digitals being front digitals, the second, fourth, seventh, ninth and eleventh digitals being back digitals, the improvement comprising:

a display strip for fixed juxtaposition to the keyboard, the strip oriented parallel to the keyboard and having a length along the keyboard of at least three octave spans, a pattern of fourteen landmark elements arranged in a line parallel to the display strip, the landmark elements being of first and second visual types, the center-to-center spacing of consecutive elements of the pattern being a constant distance d which is one seventh of an octave span, the pattern having a plurality of each type of visual element in each of its two octave spans, means for moving the pattern of fourteen landmark elements bodily parallel to the display strip into a sequence of seven discrete positions relative to the display strip, the distance between each pair of consecutive positions of the sequence being equal to the distance d.

17. An improved keyboard landmark display for orienting a musician on a musical keyboard, the keyboard having a plurality of twenty-one front digitals and a plurality of fifteen back digitals, the front and back digitals arranged in a single sequence running from left to right in periodic pattern with a period of twelve digitals, any twelve consecutive digitals occupying a constant distance of an octave span along the keyboard, within a particular octave span the first, third, fifth, sixth, eighth, tenth and twelfth digitals being front digitals, the second, fourth, seven, ninth and eleventh digitals being back digitals, the improvement comprising:

an electrically changeable landmark element mounted on the front top surface of each of the front digitals, the center-to-center spacing of consecutive landmark elements being equal to a distance d which is one seventh of an octave span, each landmark element capable of existing in first and second visual states, electrical means for bringing each of the elements into its first visual state, electrical means for bringing each of the elements into its second visual state, electrical means for creating a pattern of the landmark elements in their first and second visual states, the pattern of landmark elements occupying fourteen consecutive members of the plurality of front digitals, the pattern containing multiple elements in each of the two states in each of its two octave spans, a landmark positioner that can position the pattern of landmark elements in a sequence of seven discrete positions along the keyboard, the distance between each pair of consecutive positions of the sequence being equal to the distance d.

* * * * *